US012625362B2

(12) United States Patent
Kim et al.

(10) Patent No.: US 12,625,362 B2
(45) Date of Patent: *May 12, 2026

(54) MICRO-OPTICS SYSTEM FOR NON-ROTATIONAL SCANNING COMPRISING A PLURALITY OF MICRO-OPTICAL ELEMENTS HAVING DIFFERENT INCLINATION PATTERNS

(71) Applicant: OPTOELEC CO., LTD, Gyeonggi-do (KR)

(72) Inventors: Yong Woo Kim, Gyeonggi-do (KR); Jun Yuk Lee, Gyeonggi-do (KR)

(73) Assignee: OPTOELEC CO., LTD, Anyans-si (KR)

( * ) Notice: Subject to any disclaimer, the term of this patent is extended or adjusted under 35 U.S.C. 154(b) by 1365 days.

This patent is subject to a terminal disclaimer.

(21) Appl. No.: 17/301,518

(22) Filed: Apr. 6, 2021

(65) Prior Publication Data

US 2022/0163637 A1 May 26, 2022

(30) Foreign Application Priority Data

Feb. 6, 2020 (KR) ........................ 10-2020-0014385
Mar. 5, 2020 (KR) ........................ 10-2020-0027492

(51) Int. Cl.
*G02B 26/08* (2006.01)
*G02B 5/136* (2006.01)

(52) U.S. Cl.
CPC ......... *G02B 26/0833* (2013.01); *G02B 5/136* (2013.01)

(58) Field of Classification Search
CPC ...................................................... G02B 5/136
See application file for complete search history.

(56) References Cited

U.S. PATENT DOCUMENTS 12,282,119 B2 * 4/2025 Kim ........................ G01S 17/42
2020/0194973 A1 * 6/2020 Bloemen ............. H01S 5/18388

FOREIGN PATENT DOCUMENTS

| CN | 101952774 B * | 5/2013 | ............. G03B 33/06 |
| EP | 3447862 A1 * | 2/2019 | ............... G02B 3/08 |
| KR | 100981685 B1 | 9/2010 | |
| KR | 20130132770 A | 12/2013 | |
| KR | 101384015 B1 | 4/2014 | |
| KR | 20150022164 A | 3/2015 | |
| KR | 20170029205 A | 3/2017 | |
| KR | 102048082 B1 | 11/2019 | |

* cited by examiner

*Primary Examiner* — Paul C Lee
(74) *Attorney, Agent, or Firm* — You & IP, LLC

(57) ABSTRACT

A micro-optics system for non-rotational scanning includes a plurality of micro-optical elements having different inclination patterns. The different inclination patterns are implemented such that a plurality of light rays incident from a light source are increasingly refracted by 1 degree in an outward direction from a center of the plurality of micro-optical elements.

13 Claims, 24 Drawing Sheets a)

$\Phi = \arcsin(n*\sin\theta)-\theta$ b)

c)

$$\theta_1 = \alpha$$

ANG28   ANG29   ANG30

TA28   TA29   TA30

(b)

ANG28   ANG29   ANG30
ANG28   ANG28   ANG29   ANG29   ANG30   ANG30

TA28   TA29   TA30

(c)

P2

(a)

ANG28  ANG29  ANG30

TA28  TA29  TA30

(b)

ANG28  ANG28  ANG29  ANG29  ANG30  ANG30

ANG28  ANG28  ANG29  ANG29  ANG30  ANG30

TA28  TA29  TA30

(c)

P3

(a)

ANG43    ANG44    ANG45

TA43    TA44    TA45

(b)

ANG43    ANG44    ANG45
ANG43    ANG43    ANG44    ANG44    ANG45    ANG45

TA43    TA44    TA45

(c)

(a)    ANG43    ANG44    ANG45

TA43    TA44    TA45

(b)    ANG43    ANG43    ANG44    ANG44    ANG45    ANG45
       ANG43          ANG44          ANG45

TA43    TA44    TA45

(c)

MICRO-OPTICS SYSTEM FOR NON-ROTATIONAL SCANNING COMPRISING A PLURALITY OF MICRO-OPTICAL ELEMENTS HAVING DIFFERENT INCLINATION PATTERNS

CROSS-REFERENCE TO RELATED APPLICATION

This application claims priority to and the benefit of Korean Patent Application No. 10-2020-0014385, filed on Feb. 6, 2020, and Korean Patent Application No. 10-2020-0027492, filed Mar. 5, 2020, the disclosures of which are incorporated herein by reference in their entirety.

BACKGROUND

1. Field of the Invention

The present invention relates to a micro-optics system for non-rotational scanning, and more particularly, to a micro-optics system for non-rotational scanning that enables scanning without rotation.

2. Discussion of Related Art

Three-dimensional (3D) scanning is a technology for scanning and detecting objects using laser light. 3D scanning can be used in various fields such as autonomous vehicles, medical devices, and inspection equipment.

A conventional 3D scanning device emits laser light by rotating a mirror of the 3D scanning device and scans and detects an object according to received laser light. When using a conventional 3D scanning device for a long time, optical alignment variation may occur due to rotation. This leads to measurement errors. Durability issues may occur due to rotation. In addition, a conventional 3D scanning device has a complicated structure, and thus the manufacturing cost is high.

SUMMARY OF THE INVENTION

The present invention is directed to providing a micro-optics system for non-rotational scanning in which scanning can be performed with no rotation.

A micro-optics system for non-rotational scanning according to an embodiment of the present invention comprises a plurality of micro-optical elements having different inclination patterns, wherein the different inclination patterns are implemented such that a plurality of light rays incident from a light source are increasingly refracted by 1 degree in an outward direction from a center of the plurality of micro-optical elements.

The plurality of micro-optical elements comprise a first micro-optical element, a second micro-optical element, and a third micro-optical element.

The first micro-optical element comprises a first surface which is flat, and a second surface which includes a first region, a second region, and a third region arranged with respect to the center, and each of the first region, the second region, and the third region includes a first inclination pattern implemented such that the plurality of light rays are increasingly refracted in a range of 1 to 15 degrees from the center.

The second micro-optical element is stacked on the first micro-optical element, the third micro-optical element is stacked on the second micro-optical element, a length of the first micro-optical element is shorter than a length of the second micro-optical element, and the length of the second micro-optical element is shorter than a length of the third micro-optical element.

The first region, the second region, and the third region include a gap between the first region and the second region and a gap between the second region and the third region, and the gap between the second region and the third region is greater than the gap between the first region and the second region.

The second micro-optical element comprises a third surface including a fourth region, a fifth region, and a sixth region that face the first region, the second region, and the third region, respectively, and a fourth surface including a seventh region, an eighth region, and a ninth region that correspond to the fourth region, the fifth region, and the sixth region, respectively, the fourth region is flat, and each of the fifth region and the sixth region includes a second inclination pattern implemented such that the plurality of light rays refracted through the second region and the third region are refracted in a range of 16 to 30 degrees from the center.

The third micro-optical element comprises a fifth surface including a tenth region, an eleventh region, and a twelfth region that face the seventh region, the eighth region, and the ninth region, respectively, and a sixth surface including a thirteenth region, a fourteenth region, and fifteenth region that correspond to the tenth region, the eleventh region, and the twelfth region, respectively, the seventh region is flat, and the twelfth region includes a third inclination pattern implemented such that the plurality of light rays refracted through the sixth region are refracted in a range of 31 to 45 degrees from the center.

The center of the plurality of micro-optical elements includes no inclination pattern to prevent light rays incident from the center among the plurality of light rays from being refracted.

The micro-optics system according to an embodiment of the present invention comprises a plurality of micro-optical elements having different inclination patterns.

The plurality of micro-optical elements are classified into three zones, a first zone among the three zones includes a first micro-optical element that is included in the plurality of micro-optical elements and that includes a first inclination pattern such that a plurality of light rays incident from a light source are refracted in a range of 1 to 15 degrees from a center, a second zone among the three zones includes a second micro-optical element that is included in the plurality of micro-optical elements and that includes a second inclination pattern such that the plurality of incident light rays are refracted in a range of 16 to 30 degrees from the center, and a third zone among the three zones includes a third micro-optical element that is included in the plurality of micro-optical elements and that includes a third inclination pattern such that the plurality of incident light rays are refracted in a range of 31 to 45 degrees from the center.

The first inclination pattern is implemented to face the second inclination pattern, and the third inclination pattern does not face the second inclination pattern but is implemented to correspond to the second inclination pattern.

The first inclination pattern includes a plurality of first inclined planes and a plurality of second inclined planes, and the angle of inclination of the plurality of first inclined planes increases in a direction away from the center.

The second inclination pattern includes a plurality of third inclined planes and a plurality of fourth inclined planes, and the angle of inclination of the plurality of third inclined planes increases in a direction away from the center.

The third inclination pattern includes a plurality of fifth inclined planes and a plurality of sixth inclined planes, and the angle of inclination of the plurality of fifth inclined planes increases in a direction away from the center.

Light rays incident from the center are not refracted.

A micro-optics system for non-rotational scanning according to an embodiment of the present invention comprises a first micro-optical element including a first surface and a second surface, a second micro-optical element including a third surface and a fourth surface, and a third micro-optical element including a fifth surface and a sixth surface.

The first surface is flat, the second surface includes a first region, a second region, and a third region arranged with respect to a center, each of the first region, the second region, and the third region includes a first inclination pattern implemented such that a plurality of light rays incident from a light source are refracted in a range of 1 to 15 degrees in an outward direction from the center, light incident from the center is not refracted, the third surface includes a fourth region, a fifth region, and a sixth region that face the first region, the second region, and the third region, respectively, the fourth region is flat, each of the fifth region and the sixth region includes a second inclination pattern implemented such that the light refracted through the second region and the third region is refracted in a range of 16 to 30 degrees, the fifth surface includes a seventh region, an eighth region, and a ninth region that correspond to the fourth region, the fifth region, and the sixth region, respectively, the seventh region is flat, the eighth region and the ninth region include an inclination pattern, and the fifth surface includes a third inclination pattern implemented such that the light refracted through the sixth region is refracted in a range of 31 to 45 degrees.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which:

FIG. 8 shows a schematic diagram for computing an angle of inclination of a second inclination pattern implemented in the second micro-optical element shown in FIG. 7;

FIG. 12 shows a schematic view of a micro-optics system for non-rotational scanning according to another embodiment of the present invention;

FIG. 24 shows an enlarged view of a part of a first micro-optical element according to still another embodiment of the present invention;

DETAILED DESCRIPTION OF EXEMPLARY EMBODIMENTS

Figure 1:
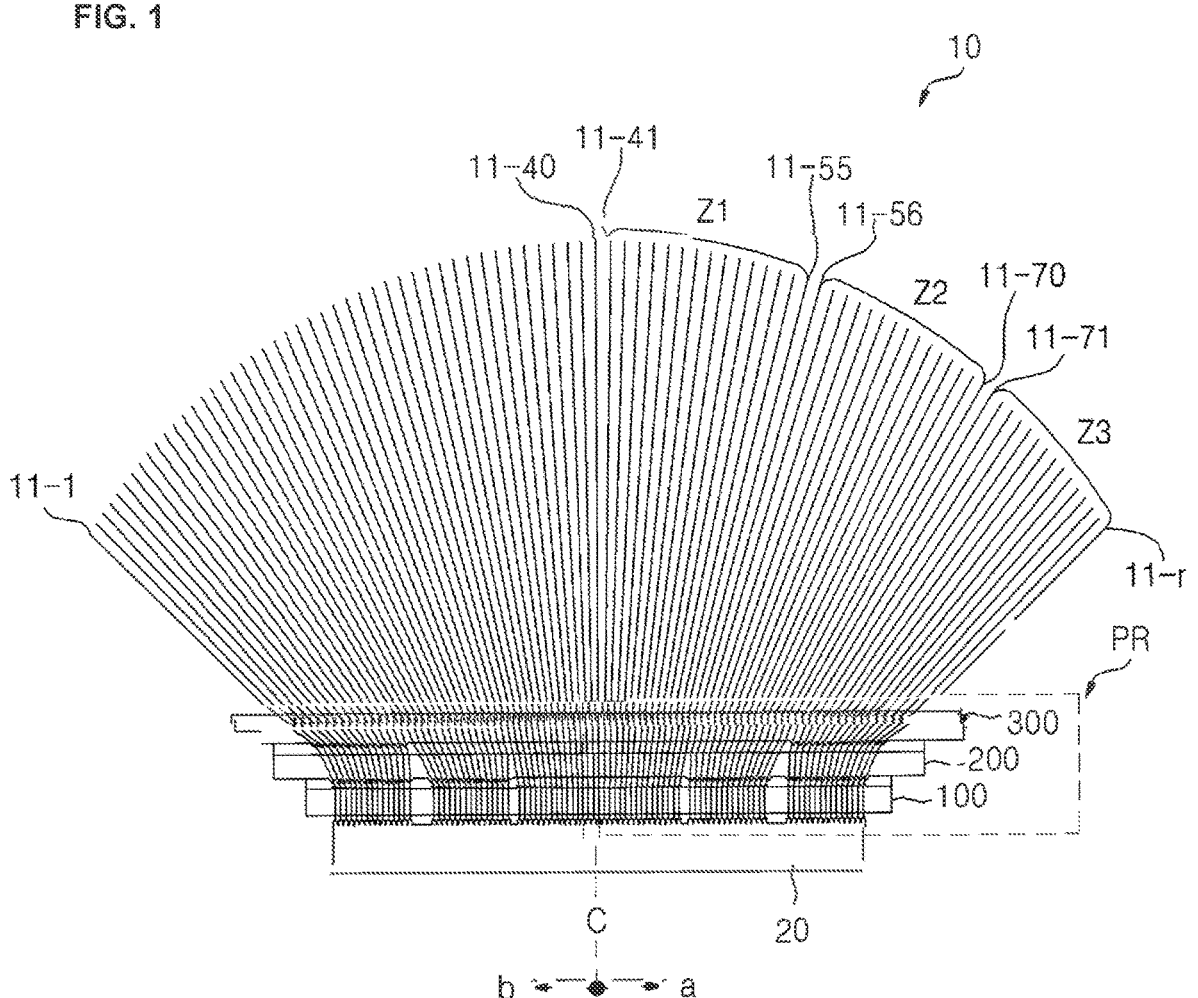
FIG. 1 shows a cross-sectional view of a micro-optics system for non-rotational scanning according to an embodiment of the present invention.

A specific structural or functional description of embodiments according to the inventive concept disclosed herein has merely been illustrated for the purpose of describing the embodiments according to the inventive concept, and the embodiments according to the inventive concept may be implemented in various forms and are not limited to the embodiments described herein.

Since the embodiments according to the inventive concept may be changed in various ways and may have various forms, the embodiments are illustrated in the drawings and described in detail herein. However, there is no intent to limit the embodiments according to the inventive concept to the particular forms disclosed. Conversely, the embodiments are to cover all modifications, equivalents, and alternatives falling within the scope of the invention.

In addition, the terms such as "first" or "second" may be used to describe various elements, but these elements are not limited by these terms. These terms are used to only distinguish one element from another element. For example, a first element could be termed a second element, and, similarly, a second element could be termed a first element without departing from the scope of the inventive concept.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, other expressions describing the relationships between elements should be interpreted in the same way (e.g., "between" versus "directly between," "adjacent" versus "directly adjacent," etc.).

The terms used herein are merely set forth to explain the embodiments of the present invention, and the scope of the present invention is not limited thereto. As used herein, the singular forms are intended to include the plural forms as well, unless the context clearly indicates otherwise. It should be further understood that the terms "comprises," "comprising," "includes," "including," "has" and/or "having," when used in this specification, specify the presence of stated features, integers, steps, operations, elements, components, or groups thereof but do not preclude the presence or addition of one or more other features, integers, steps, operations, elements, components, or groups thereof.

Unless otherwise defined, all terms (including technical and scientific terms) used herein have the same meaning as commonly understood by those skilled in the art. Generally used terms, such as terms defined in dictionaries, should be construed as having meanings matching contextual meanings in the art. In this description, unless defined clearly, terms are not to be construed as having ideal or excessively formal meanings.

Hereinafter, the present invention will be described in detail by explaining exemplary embodiments of the present invention with reference to the accompanying drawings.

FIG. 1 shows a cross-sectional view of a micro-optics system for non-rotational scanning according to an embodiment of the present invention.

Referring to FIG. 1, a micro-optics system 10 for non-rotational scanning may be used as a sensor for scanning and detecting an object in various fields such as autonomous vehicles, medical devices, inspection equipment, smartphones, or electronic devices. In some embodiments, the micro-optics system 10 for non-rotational scanning may be referred to in various terms as a sensor, a light detection and ranging (lidar) sensor, a sensor assembly, a scanning device, a scanner, a three-dimensional (3D) scanning device, a 3D scanner, an optical component, or an optical element, but the present invention is not limited thereto. The micro-optics system 10 for non-rotational scanning may be implemented on a light source 20. A plurality of light rays 11-1 to 11-$n$ (here, n is a natural number) are emitted from the light source 20. The light source 20 may be implemented in a vertical-cavity surface-emitting laser (VCSEL) array. A micro-optical element refers to an optical system with a size of tens of micrometers to millimeters.

Figure 2:
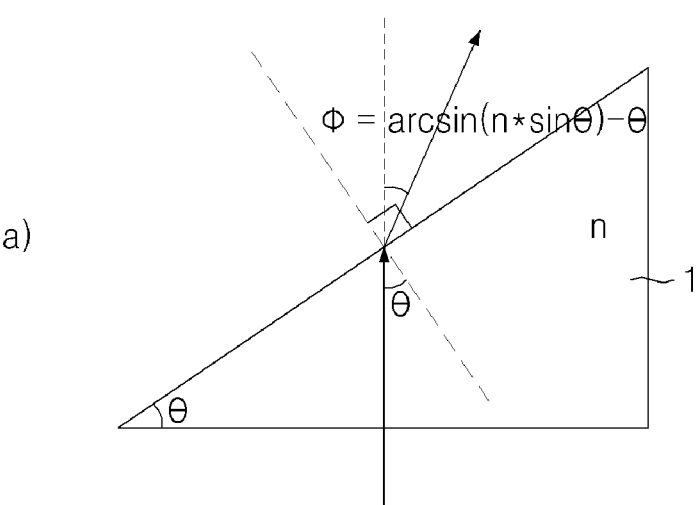
FIG. 2 shows a partial pattern of a conventional Fresnel lens and a graph of a correlation between the angle of inclination and reflectance of the part of the pattern of the conventional Fresnel lens.
Figure 2:
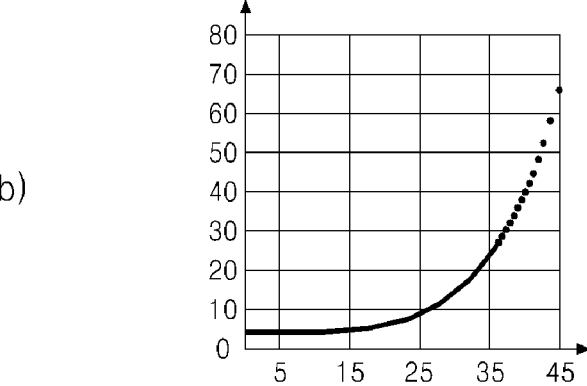
Figure 2:
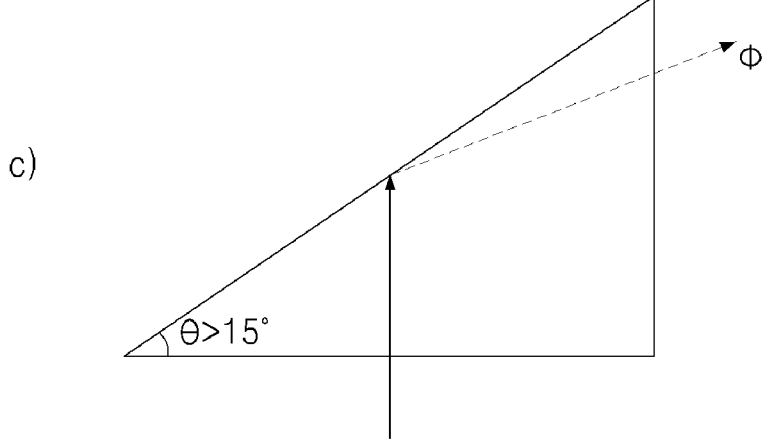

FIG. 2 shows a partial pattern of a conventional Fresnel lens and a graph of a correlation between the angle of inclination and reflectance of the part of the pattern of the conventional Fresnel lens. FIG. 2A shows a partial pattern of a conventional Fresnel lens. Referring to FIG. 2A, the angle of refraction $\varphi$ of a partial pattern 1 of the conventional Fresnel lens is computed using the following equation.

$$\varphi = \arcsin(n^* \sin \theta) - \theta \qquad \text{[Equation 1]}$$

Here, n represents the refractive index of a medium, and $\theta$ represents the angle of inclination of the partial pattern 1 of the conventional Fresnel lens.

FIG. 2B shows a graph of a correlation between an angle of inclination and reflectance of the partial pattern of the conventional Fresnel lens. The x-axis of the graph represents the angle of refraction $\varphi$ of the partial pattern 1 of the conventional Fresnel lens, and the y-axis of the graph represents the reflectance.

Referring to FIG. 2B, while the angle of refraction $\varphi$ of the partial pattern 1 of the conventional Fresnel lens increases from 0 degrees to 15 degrees, the reflectance is constant, i.e., about 5%. However, when the angle of refraction $\varphi$ of the partial pattern 1 of the conventional Fresnel lens increases to 15 degrees or more, the reflectance increases rapidly.

FIG. 2C shows reflected light when the angle of inclination of the partial pattern of the conventional Fresnel lens is 15 degrees or higher.

Referring to FIGS. 2B and 2C, when the angle of inclination $\theta$ of the partial pattern 1 of the conventional Fresnel lens is higher than or equal to 15 degrees, the reflectance increases rapidly, and thus light rays are not refracted but reflected.

That is, when the conventional Fresnel lens is used, it is difficult for a plurality of light rays to be refracted at an angle of 15 degrees or more. The present invention proposes a new structure capable of scanning an object in a wide range without rotating using a motor.

Referring to FIG. 1, the micro-optics system 10 includes a plurality of micro-optical elements 100, 200, and 300. By including the plurality of micro-optical elements 100, 200, and 300 having different inclination patterns, it is possible to scan and detect an object in a certain range without rotating the micro-optics system 10.

Figure 3:
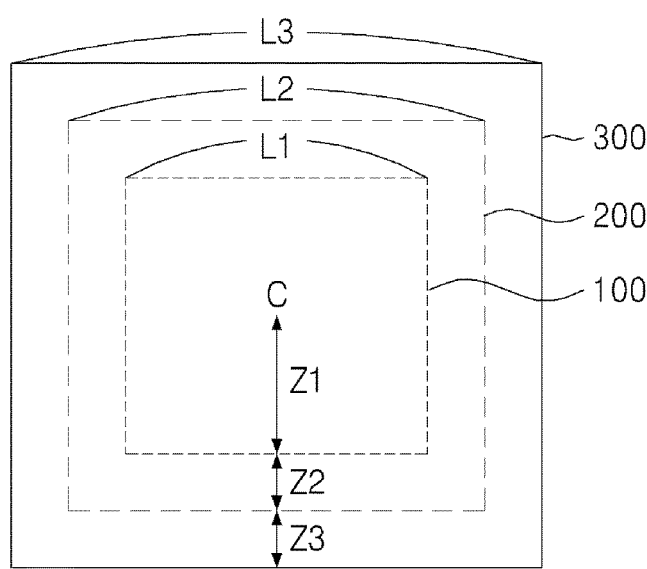
FIG. 3 shows a top view of the micro-optics system for non-rotational scanning shown in FIG. 1.

FIG. 3 shows a top view of the micro-optics system for non-rotational scanning shown in FIG. 1. In FIG. 3, a portion indicated by a solid line is a visible portion, and a portion indicated by a dotted line indicates a portion that is not visible to the eye.

Referring to FIGS. 1 and 3, the plurality of micro-optical elements 100, 200, and 300 are rectangular. In some embodiments, the plurality of micro-optical elements 100, 200, and 300 may be implemented in a circular shape.

The second micro-optical element 200 may be stacked on the first micro-optical element 100. The third micro-optical element 300 may be stacked on the second micro-optical element 200.

The length L1 of the first micro-optical element 100 is shorter than the length L2 of the second micro-optical element 200. The length L2 of the second micro-optical element 200 is shorter than the length L3 of the third micro-optical element 300.

The plurality of micro-optical elements 100, 200, and 300 may be classified into three zones Z1, Z2, and Z3. The first zone Z1 is the closest zone to a center C, the second zone Z2 is the next closest zone, and the third zone Z3 is the farthest zone from the center C.

Among the three zones Z1, Z2, and Z3, the first zone Z1 includes the first micro-optical element 100 including a first inclination pattern so that a plurality of light rays 11-41 to 11-55 incident from the light source 20 are refracted at an angle of 1 to 15 degrees with respect to the center C. In the first zone Z1, the plurality of incident light rays 11-41 to 11-55 are refracted at an angle of 1 to 15 degrees. For example, the first light ray 11-41 is refracted at an angle of 1 degree, and the fifteenth light ray 11-55 is refracted at an angle of 15 degrees.

Among the three zones Z1, Z2, and Z3, the second zone Z2 includes the second micro-optical element 200 including a second inclination pattern so that a plurality of incident light rays 11-56 to 11-70 are refracted at an angle of 16 to 30 degrees with respect to the center C. In the second zone Z2, the plurality of incident light rays 11-56 to 11-70 are refracted at an angle of 16 to 30 degrees. For example, the sixteenth light ray 11-56 is refracted at an angle of 16 degrees, and the thirtieth light ray 11-70 is refracted at an angle of 30 degrees.

Among the three zones Z1, Z2, and Z3, the third zone Z3 includes the third micro-optical element 300 including a third inclination pattern so that a plurality of incident light rays 11-71 to 11-$n$ are refracted at an angle of 31 to 45 degrees with respect to the center C. In the third zone Z3, the plurality of incident light rays 11-71 to 11-$n$ are refracted at an angle of 31 to 45 degrees. For example, the thirty-first light ray 11-71 is refracted at an angle of 31 degrees, and the forty-fifth light ray 11-$n$ is refracted at an angle of 45 degrees.

By refracting light rays in the three zones Z1, Z2, and Z3 at different angles, it is possible to scan and detect an object within a certain range (0 to 90 degrees) without rotating the micro-optics system 10. Since the plurality of light rays 11-40 to 11-$n$ are refracted at an angle of 0 to 45 degrees in one direction a from the center C, the plurality of light rays 11-1 to 11-$n$ are refracted at an angle of 0 to 90 degrees in both directions a and b from the center C.

Figure 4:
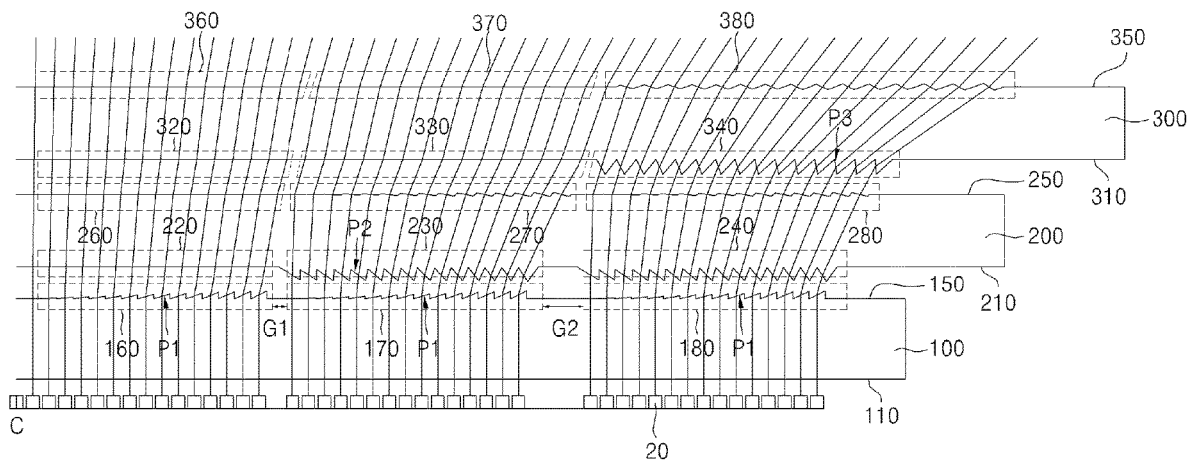
FIG. 4 shows an enlarged view of a part of the micro-optics system for non-rotational scanning shown in FIG. 1.

FIG. 4 shows an enlarged view of a part PR of the micro-optics system for non-rotational scanning shown in FIG. 1.

Referring to FIGS. 1 and 4, the micro-optics system 10 for non-rotational scanning includes the plurality of micro-optical elements 100, 200, and 300 having different inclination patterns 160, 170, 180, 230, 240, and 340.

The different inclination patterns 160, 170, 180, 230, 240, and 340 are implemented such that the plurality of light rays 11-1 to 11-$n$ incident from the light source 20 are increasingly refracted by 1 degree in an outward direction from the center C of the plurality of micro-optical elements 100, 200, and 300. The light rays are not refracted at the center C. Therefore, the plurality of light rays 11-1 to 11-$n$ are increasingly refracted by 1 degree in the range from 0 to 45 degrees with respect to the center C.

The first micro-optical element 100 includes a first surface 110 which is flat and a second surface 150 which includes a first region 160, a second region 170, and a third region 180 arranged with respect to the center C.

Each of the first region 160, the second region 170, and the third region 180 includes a first inclination pattern P1, which is implemented such that a plurality of light rays 11-41 to 11-$n$ are increasingly refracted in the range of 1 to 15 degrees from the center C. The first inclination pattern P1 is the same as the others.

The first region 160, the second region 170, and the third region 180 include a first gap G1 between the first region 160 and the second region 170 and a second gap G2 between the second region 170 and the third region 180. The gap G2 between the second region 170 and the third region 180 is greater than the gap G1 between the first region 160 and the second region 170.

The second micro-optical element 200 includes a third surface 210 and a fourth surface 250.

The third surface 210 includes a fourth region 220, a fifth region 230, and a sixth region 240 which face the first region 160, the second region 170, and the third region 180, respectively.

The fourth surface 250 includes a seventh region 260, an eighth region 270, and a ninth region 280 which correspond to the fourth region 220, the fifth region 230, and the sixth region 240, respectively.

The fourth region 220 is flat.

Each of the fifth region 230 and the sixth region 240 includes a second inclination pattern P2, which is implemented such that the plurality of light rays 11-55 to 11-$n$ refracted through the second region 170 and the third region 180 are refracted in the range of 16 to 30 degrees with respect to the center C, respectively.

The first inclination pattern P1 is implemented to face the second inclination pattern P2.

The seventh region 260 is flat.

The eighth region 270 and the ninth region 280 have an inclination pattern. The inclination pattern is different from the first inclination pattern P1, the second inclination pattern P2, and the third inclination pattern P3.

The third micro-optical element 300 includes a fifth surface 310 and a sixth surface 350.

The fifth surface 310 includes a tenth region 320, an eleventh region 330, and a twelfth region 340 which face the seventh region 260, the eighth region 270, and the ninth region 280, respectively.

The sixth surface 350 includes a thirteenth region 360, a fourteenth region 370, and a fifteenth region 380 which correspond to the tenth region 320, the eleventh region 330, and the twelfth region 340, respectively.

The tenth region 320 and the eleventh region 330 are flat.

The twelfth region 340 includes the third inclination pattern P3, which is implemented such that the plurality of light rays 11-71 to 11-$n$ refracted through the sixth region 240 are refracted in the range of 31 to 45 degrees with respect to the center C.

The center C of the plurality of micro-optical elements 100, 200, and 300 includes no inclination pattern such that the light ray 11-40 incident onto the center C among the plurality of light rays 11-1 to 11-$n$ is not refracted.

The third inclination pattern P3 does not face the second inclination pattern P2 but is implemented to correspond thereto.

The thirteenth region 360 and the fourteenth region 370 are flat.

The fifteenth region 380 includes an inclination pattern. The inclination pattern is different from the first inclination pattern P1, the second inclination pattern P2, and the third inclination pattern P3.

Figure 5:
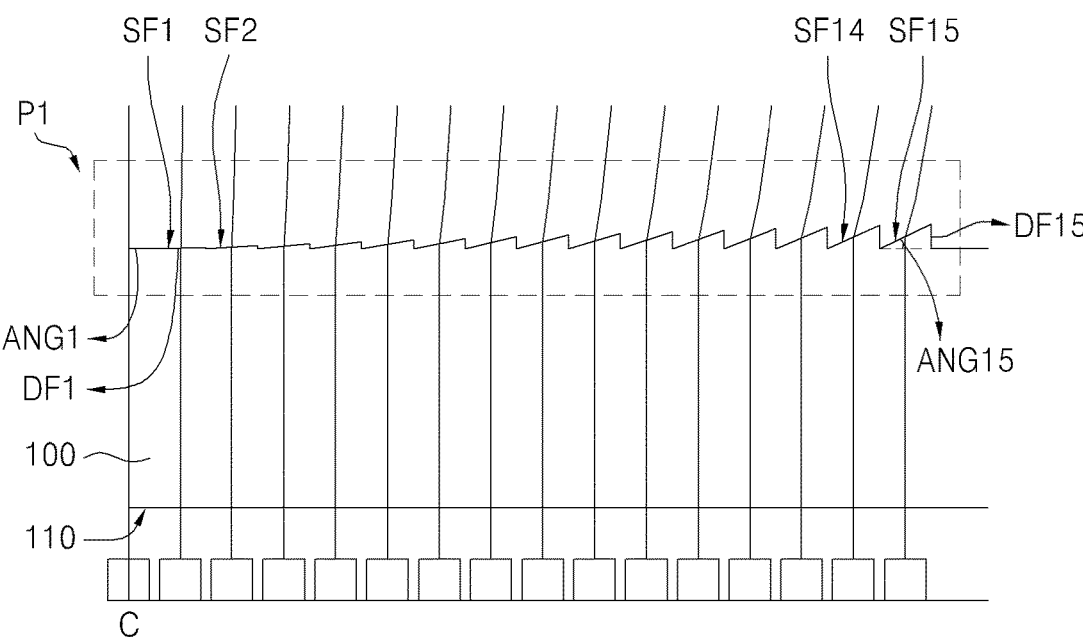
FIG. 5 shows an enlarged view of a part of a first micro-optical element shown in FIG. 4.

FIG. 5 shows an enlarged view of a part of the first micro-optical element shown in FIG. 4.

Referring to FIG. 5, the first inclination pattern P1 is shown in detail. The first inclination pattern P1 includes a plurality of first inclined planes SF1 to SF15 and a plurality of second inclined planes DF1 to DF15, and the angles of inclination ANG1 to ANG15 of the plurality of first inclined planes SF1 to SF15 increase in a direction away from the center C. For example, the fifteenth angle of inclination ANG15 is greater than the first angle of inclination ANG1. In some embodiments, each of the plurality of first inclined planes SF1 to SF15 may be referred to as a slope facet, and each of the plurality of second inclined planes DF1 to DF15 may be referred to as a draft facet.

Figure 6:
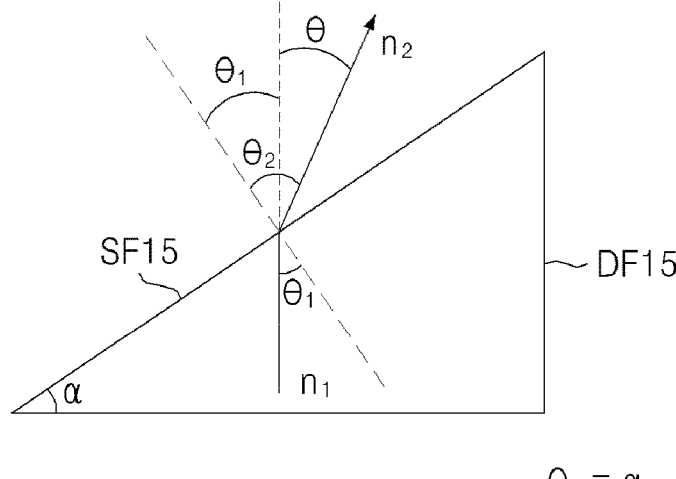
FIG. 6 shows a schematic diagram for computing an angle of inclination of a first inclination pattern implemented in a first micro-optical element shown in FIG. 5.

FIG. 6 shows a schematic diagram for computing an angle of inclination of a first inclination pattern implemented in the first micro-optical element shown in FIG. 5.

Referring to FIGS. 1 and 4 to 6, the angle of inclination α of the first inclination pattern P1 may be computed using the following equation. In FIG. 6, the first inclined plane SF15 and the second inclined plane DF15 are shown. The angle of inclination α may be the angle of inclination ANG15.

$$n_1 \sin \alpha \theta = n_2 \sin(\theta + \alpha) \qquad \text{[Equation 2]}$$

Here, $n_1$ and $n_2$ represent the refractive indices of the media, a represents an angle of inclination, and 0 represents an angle of refraction.

The relationship between the angle of refraction θ and the angle of inclination α which is computed using Equation 2 is as follows.

TABLE 1

| Angle of refraction ($\theta$) | Angle of inclination ($\alpha$) |
|---|---|
| 15 | 25.8533 |
| 14 | 24.5467 |
| 13 | 23.1692 |
| 12 | 21.7229 |
| 11 | 20.2083 |
| 10 | 18.6265 |
| 9 | 16.9799 |
| 8 | 15.2714 |
| 7 | 13.5043 |
| 6 | 11.6386 |
| 5 | 9.8146 |
| 4 | 7.9041 |
| 3 | 5.9593 |
| 2 | 3.9878 |
| 1 | 1.9985 |

In this case, it is assumed that the refractive indices $n_1$ and $n_2$ of the media are 1.5 and 1, respectively.

As illustrated in FIG. 2, it is difficult to increase the angle of refraction θ to 15 degrees or more due to the reflectance.

Referring to Table 1, the angle of inclination α of the first inclination pattern P1 increases in a direction away from the center C. For example, referring to FIG. 5, the angle of inclination ANG15 is greater than the angle of inclination ANG1. Each of the angle of inclinations ANG1 to ANG15 shown in FIG. 5 corresponds to the angle of inclination α shown in FIG. 6. The slope of the plurality of first inclined planes SF1 to SF15 increases in a direction away from the center C. The angle of inclinations of the plurality of second inclined planes DF1 to DF15 are all 0 degrees.

Figure 7:
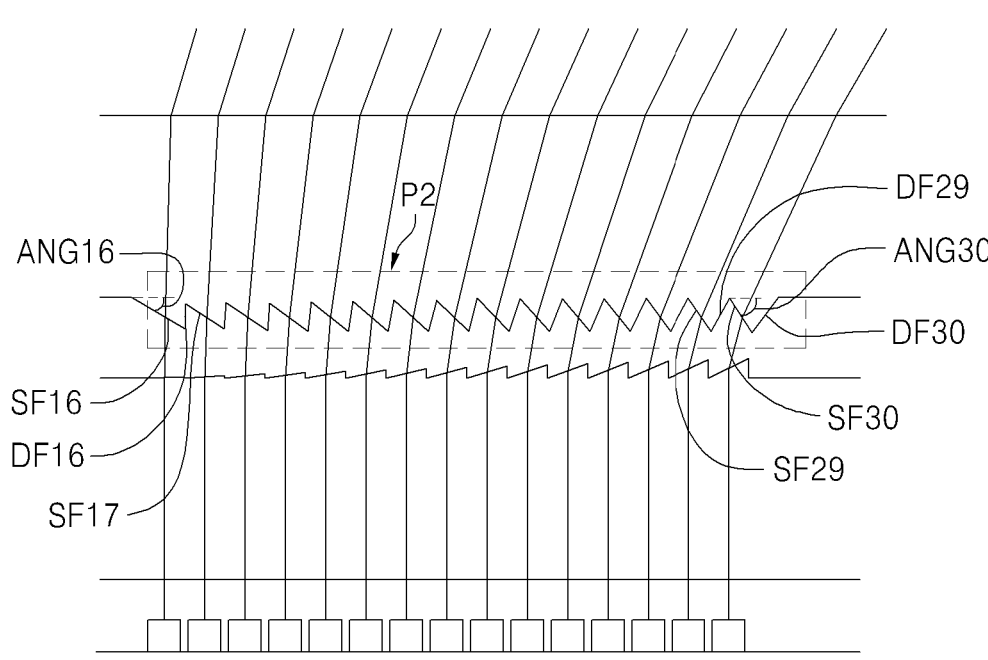
FIG. 7 shows an enlarged view of parts of first and second micro-optical elements shown in FIG. 4.

FIG. 7 shows an enlarged view of the first and second micro-optical elements shown in FIG. 4.

Referring to FIGS. 1, 4, and 7, the second inclination pattern P2 is shown in detail. The second inclination pattern P2 includes a plurality of third inclined planes SF16 to SF30 and a plurality of fourth inclined planes DF16 to DF30, and the angle of inclinations ANG16 to ANG30 of the plurality of third inclined planes SF16 to SF30 increase in a direction away from the center C. For example, the angle of inclination ANG30 is greater than the angle of inclination ANG16.

In some embodiments, each of the plurality of third inclined planes SF16 to SF30 may be referred to as a slope facet, and each of the plurality of fourth inclined planes DF16 to DF30 may be referred to as a draft facet.

Figure 8:
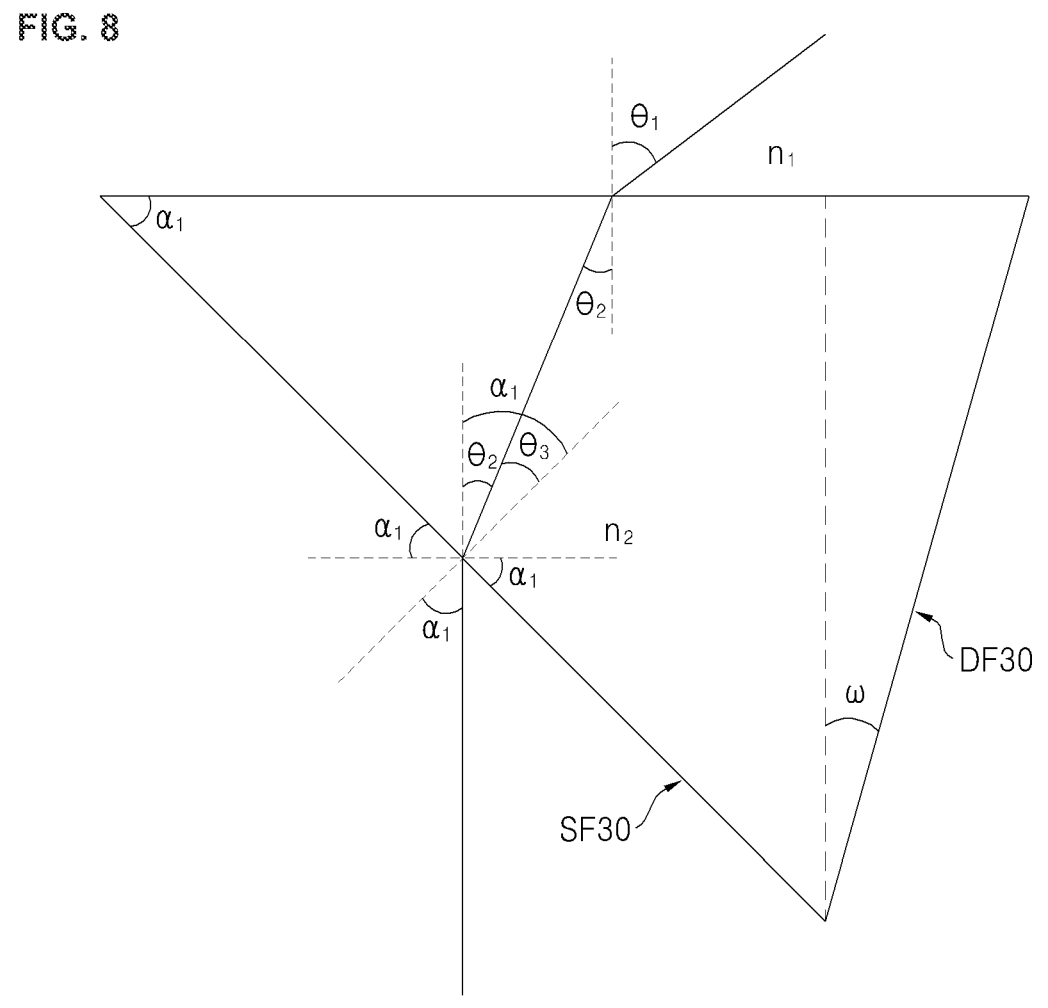

FIG. 8 shows a schematic diagram for computing the angle of inclination of the second inclination pattern implemented in the second micro-optical element shown in FIG. 7.

Referring to FIGS. 1, 4, 7, and 8, the angle of inclination $\alpha_i$ of the second inclination pattern P2 may be computed using the following equation. In FIG. 8, the third inclined plane SF30 and the fourth inclination plane DF30 are shown. The angle of inclination ai may be the angle of inclination ANG30.

$$n_2 \sin(\alpha_1 - \theta 2) = n_1 \sin(\alpha_1) \qquad \text{[Equation 3]}$$

Here, $n_1$ and $n_2$ represent the refractive indices of the media, ai represents an angle of inclination, and θ represents an angle of refraction.

The relationship between the angle of refraction $\theta_1$ and the angle of inclination $\alpha_1$ which is computed using Equation 3 is as follows.

TABLE 2

| Angle of refraction ($\theta_1$) | Angle of inclination ($\alpha_1$) |
|---|---|
| 15 | 28.4598 |
| 14 | 26.7308 |
| 13 | 24.9715 |
| 12 | 23.1818 |
| 11 | 21.3630 |
| 10 | 19.5166 |
| 9 | 17.6444 |
| 8 | 15.7482 |
| 7 | 13.8301 |
| 6 | 11.8924 |
| 5 | 9.9373 |
| 4 | 7.6798 |
| 3 | 5.9863 |
| 2 | 3.9959 |
| 1 | 1.994 |

In this case, it is assumed that the refractive indices $n_1$ and $n_2$ of the media are 1.5 and 1, respectively.

As illustrated in FIG. 2, it is difficult to increase the angle of refraction $\theta_1$ to 15 degrees or more due to the reflectance.

Referring to Table 2, the angle of inclination $\alpha_i$ of the second inclination pattern P2 increases in a direction away from the center C.

The slope of the plurality of third inclined planes SF16 to SF30 increases in a direction away from the center C. For example, referring to FIG. 7, the angle of inclination ANG30 is greater than the angle of inclination ANG16. Each of the angle of inclinations ANG16 to ANG30 shown in FIG. 7 corresponds to the angle of inclination $\alpha_1$ shown in FIG. 8. The slope of the plurality of third inclined planes SF16 to SF30 increases in a direction away from the center C. The angles of inclinations ω of the plurality of second inclined planes DF16 to DF30 increase in a direction away from the center C.

Figure 9:
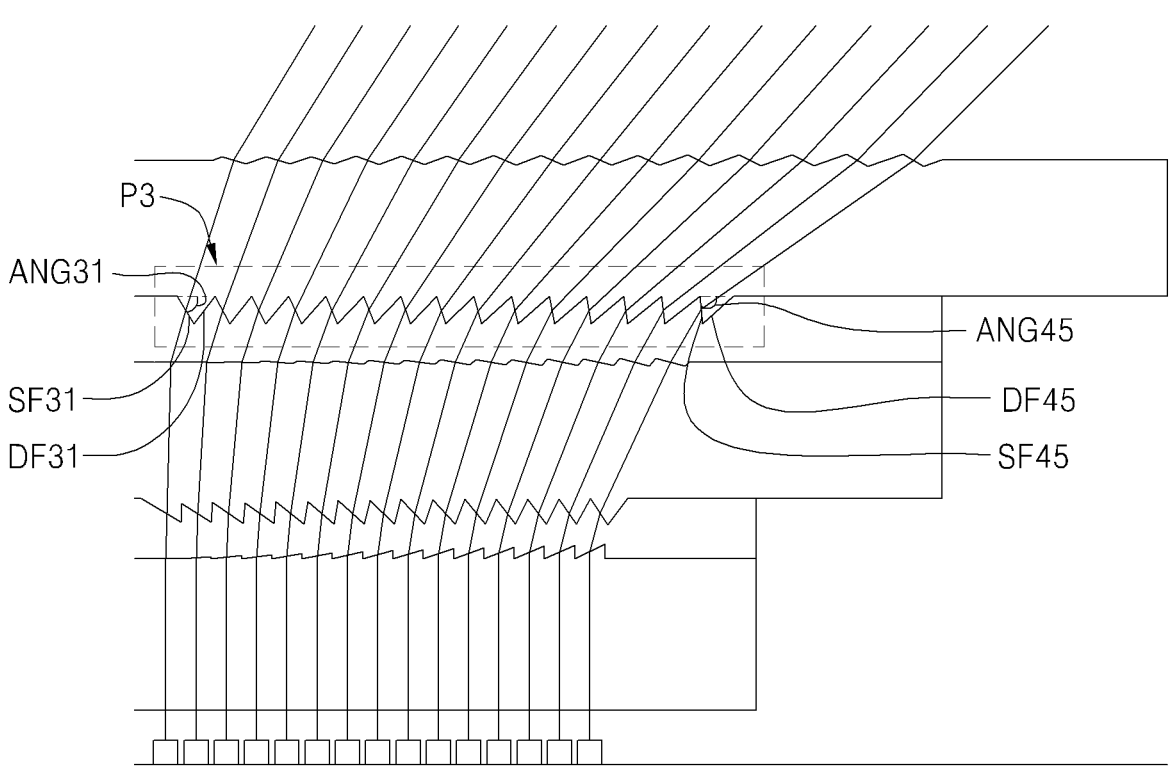
FIG. 9 shows an enlarged view of parts of first, second, and third micro-optical elements shown in FIG. 4.

FIG. 9 shows an enlarged view of the first, second, and third micro-optical elements shown in FIG. 4.

Referring to FIGS. 1, 4, and 9, the third inclination pattern P3 is shown in detail. The third inclination pattern P3 includes a plurality of fifth inclined planes SF31 to SF45 and a plurality of sixth inclined planes DF31 to DF45, and the angle of inclinations ANG31 to ANG45 of the plurality of fifth inclined planes SF31 to SF45 increase in a direction away from the center C. For example, the angle of inclination ANG45 is greater than the angle of inclination ANG31.

In some embodiments, each of the plurality of fifth inclined planes SF31 to SF45 may be referred to as a slope facet, and each of the plurality of sixth inclined planes DF31 to DF45 may be referred to as a draft facet.

The angle of inclinations ANG31 to ANG45 of the third inclination pattern P3 may be computed using Equation 3 above. That is, the angle of inclinations ANG31 to ANG45 of the third inclination pattern P3 is computed in the same manner as those of the second inclination pattern P2. This is because the second inclination pattern P2 and the third inclination pattern P3 have similar structures.

Figure 10:
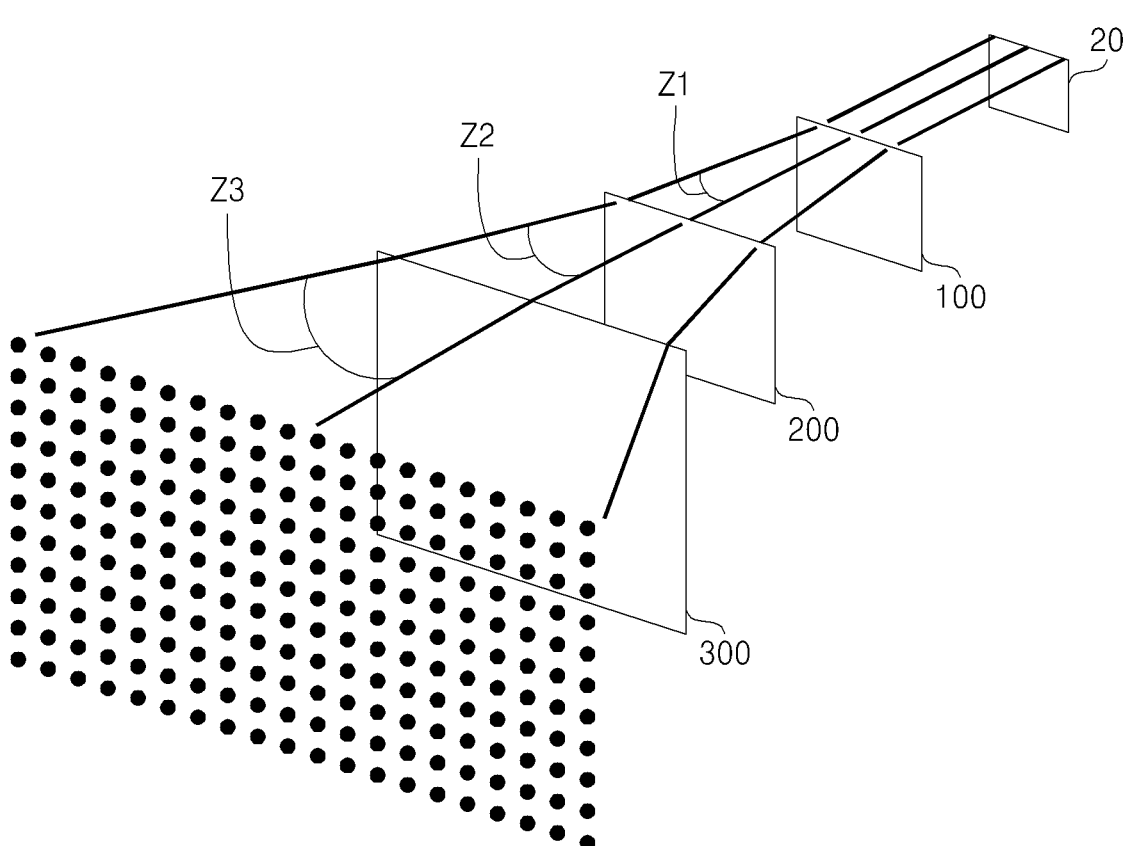
FIG. 10 shows a schematic view of a micro-optics system for non-rotational scanning according to an embodiment of the present invention.

FIG. 10 shows a schematic view of a micro-optics system for non-rotational scanning according to an embodiment of the present invention.

Referring to FIGS. 1 and 10, the plurality of micro-optical elements 100, 200, and 300 have different inclination patterns.

The different inclination patterns are implemented such that the plurality of light rays 11-1 to 11-$n$ incident from the light source 20 are increasingly refracted by 1 degree in an outward direction from the center C of the plurality of micro-optical elements 100, 200, and 300. The second angle of refraction Z2 is greater than the first angle of refraction Z1, and the third angle of refraction Z3 is greater than the second angle of refraction Z2.

By including the plurality of micro-optical elements 100, 200, and 300 having different inclination patterns, it is possible to scan and detect an object in a certain range without rotating the micro-optics system 10.

Figure 11:
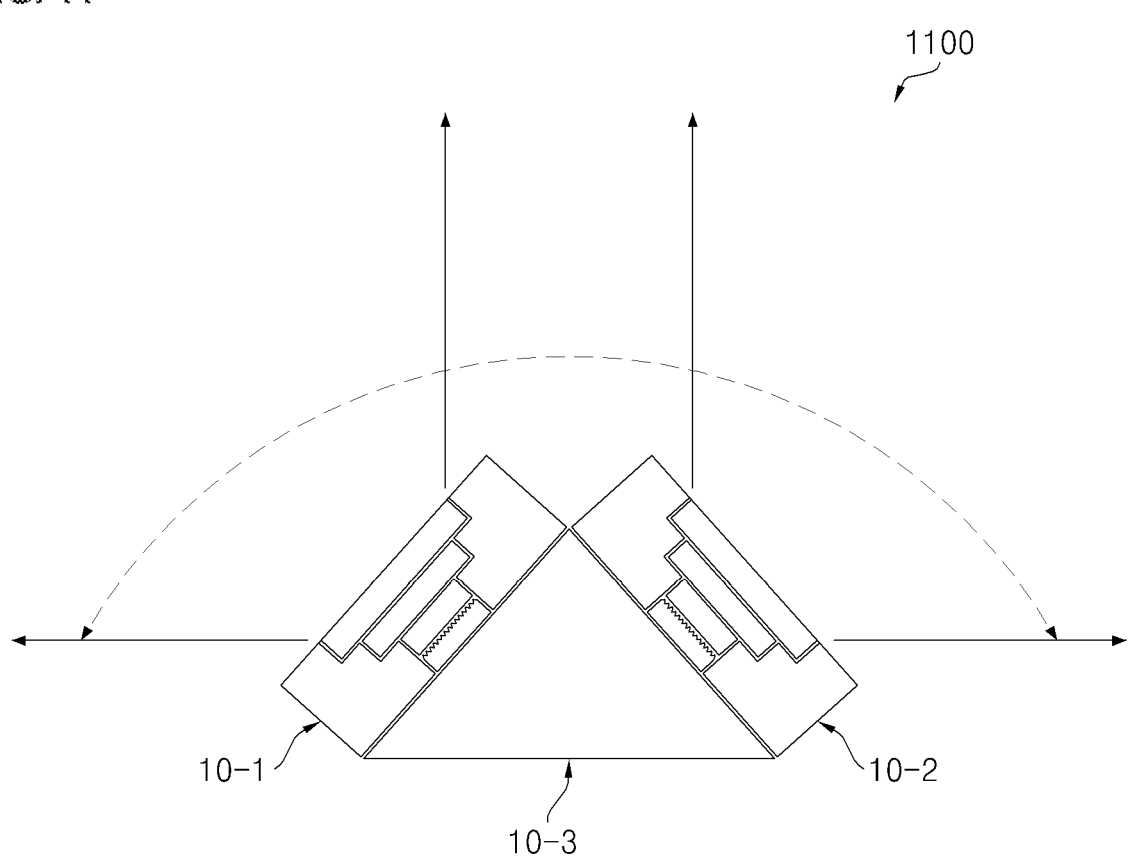
FIG. 11 shows a schematic view of a micro-optics system for non-rotational scanning according to another embodiment of the present invention.

FIG. 11 shows a schematic view of a micro-optics system for non-rotational scanning according to another embodiment of the present invention.

Referring to FIG. 11, a plurality of micro-optics systems 10-1 and 10-2 for non-rotational scanning may be coupled to each other and implemented as a sensor, a lidar sensor, a sensor assembly, a scanning device, a scanner, a 3D scanning device, a 3D scanner, or the like. Each of the micro-optics systems 10-1 and 10-2 for non-rotational scanning shown in FIG. 11 indicates the micro-optics system 10 for non-rotational scanning shown in FIG. 1. A sensor 1100 may be implemented as two micro-optics systems 10-1 and 10-2 for non-rotational scanning being coupled to each other by a support 10-3. As shown in FIG. 11, by the plurality of micro-optics systems 10-1 and 10-2 for non-rotational scanning being coupled to each other, it is possible to scan and detect an object in the range of 190 degrees. In some embodiments, the plurality of micro-optics systems for non-rotational scanning may be variously coupled to each other.

Figure 12:
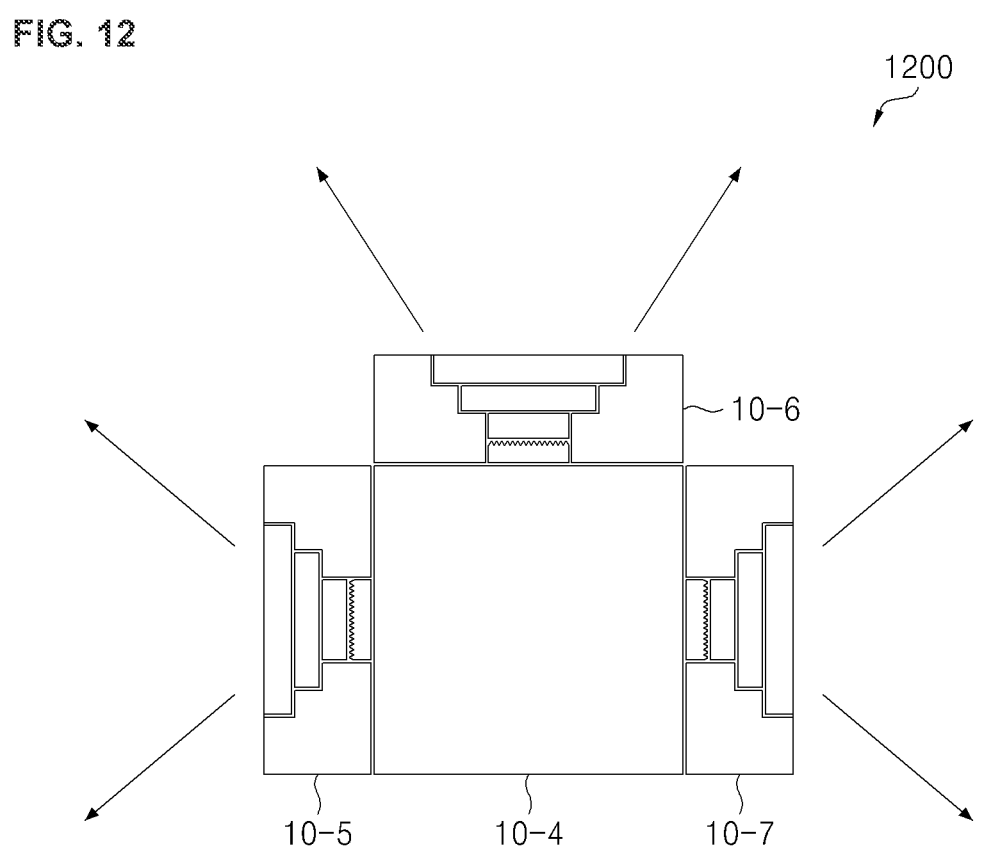

FIG. 12 shows a schematic view of a micro-optics system for non-rotational scanning according to another embodiment of the present invention.

Referring to FIG. 12, a plurality of micro-optics systems 10-5, 10-6, and 10-7 for non-rotational scanning may be coupled to each other and thus implemented as a sensor, a lidar sensor, a sensor assembly, a scanning device, a scanner, a 3D scanning device, a 3D scanner, or the like. A sensor 1200 may be implemented as three micro-optics systems 10-5, 10-6, and 10-7 for non-rotational scanning being coupled to each other by a support 10-4. As shown in FIG. 12, by the plurality of micro-optics systems 10-5, 10-6, and 10-7 for non-rotational scanning being connected to each other, it is possible to scan and detect an object in the range of 270 degrees.

Figure 13:
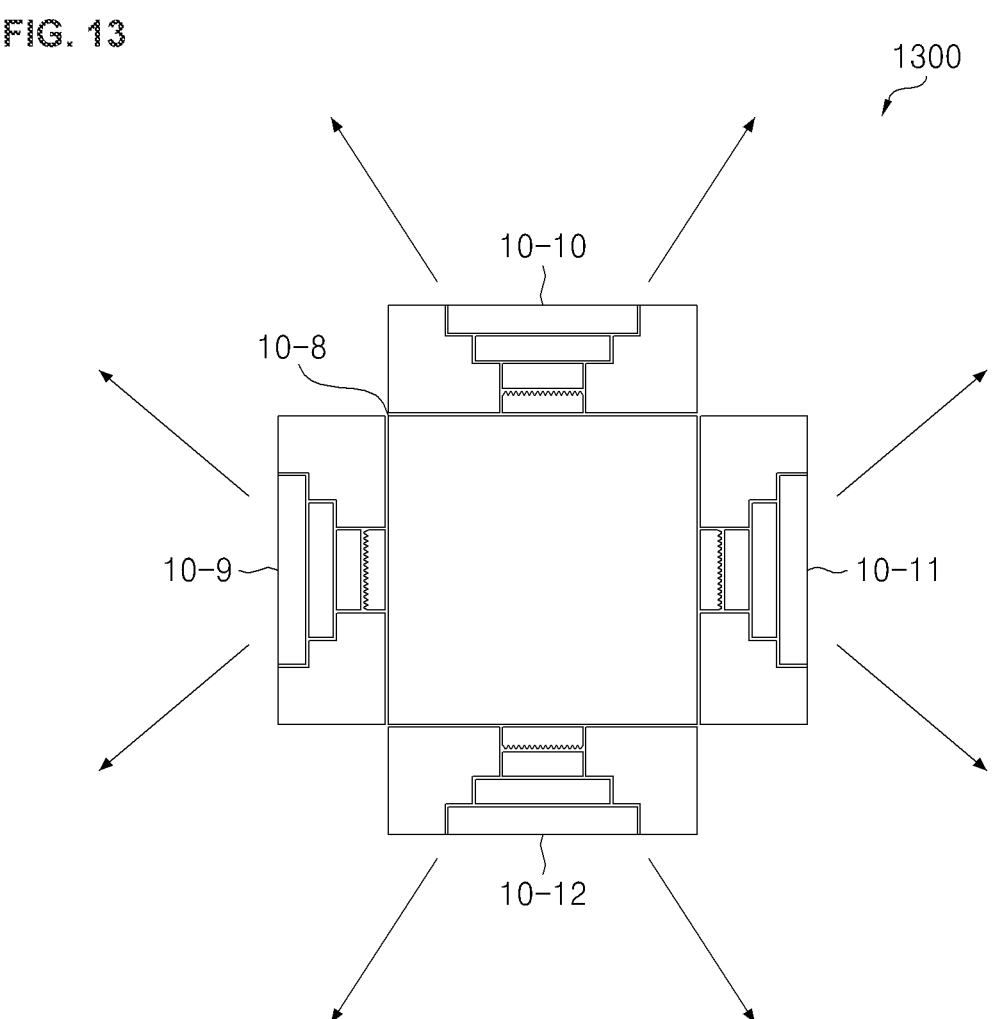
FIG. 13 shows a schematic view of a micro-optics system for non-rotational scanning according to another embodiment of the present invention.

FIG. 13 shows a schematic view of a micro-optics system for non-rotational scanning according to another embodiment of the present invention.

Referring to FIG. 13, a plurality of micro-optics systems 10-9 to 10-12 for non-rotational scanning may be coupled to each other and thus implemented as a sensor, a lidar sensor, a sensor assembly, a scanning device, a scanner, a 3D scanning device, a 3D scanner, or the like. A sensor 1300 may be implemented as four micro-optics systems 10-9 to

10-12 for non-rotational scanning being coupled to each other by a support 10-8. As shown in FIG. 13, by the plurality of micro-optics systems 10-9 to 10-12 for non-rotational scanning being coupled to each other, it is possible to scan and detect an object in the range of 360 degrees.

Figure 14:
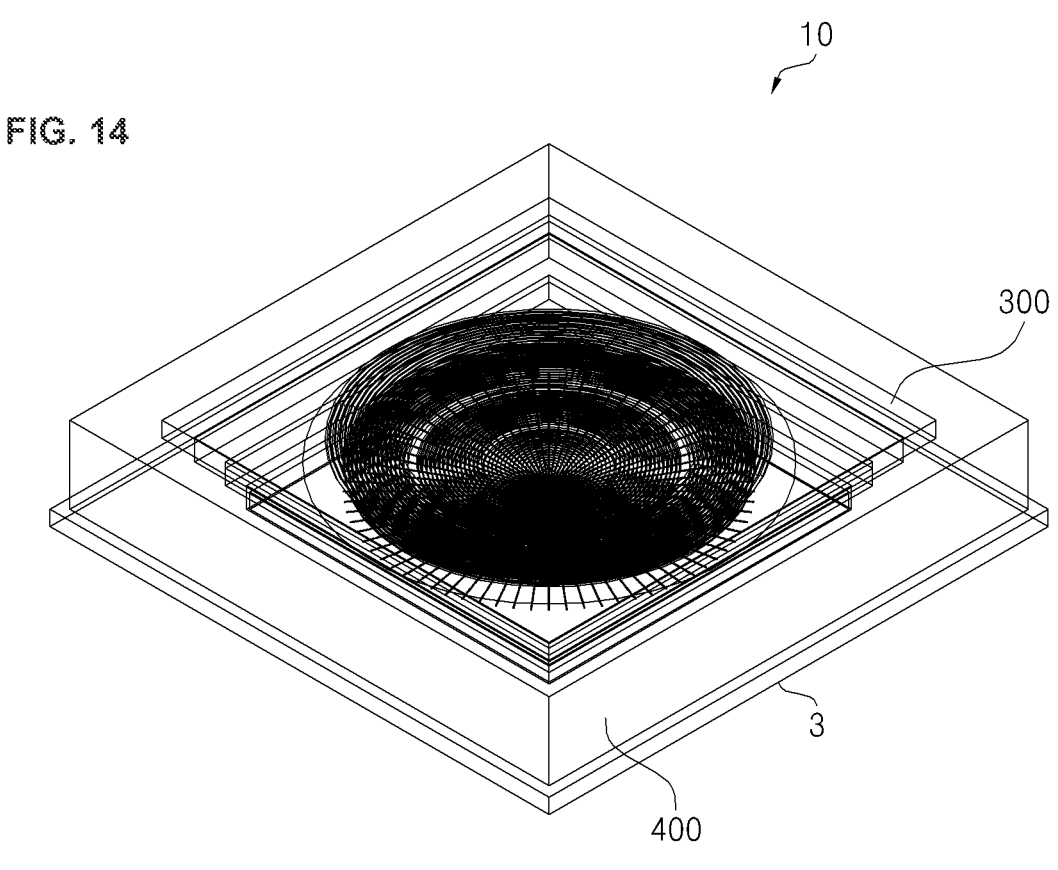
FIG. 14 shows a perspective view of a micro-optics system for non-rotational scanning according to an embodiment of the present invention.
Figure 15:
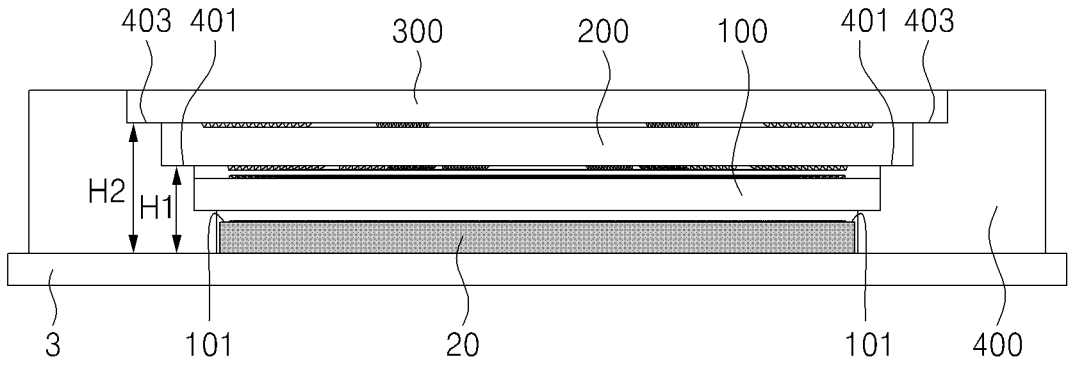
FIG. 15 shows a cross-sectional view of the micro-optics system for non-rotational scanning shown in FIG. 14.
Figure 16:
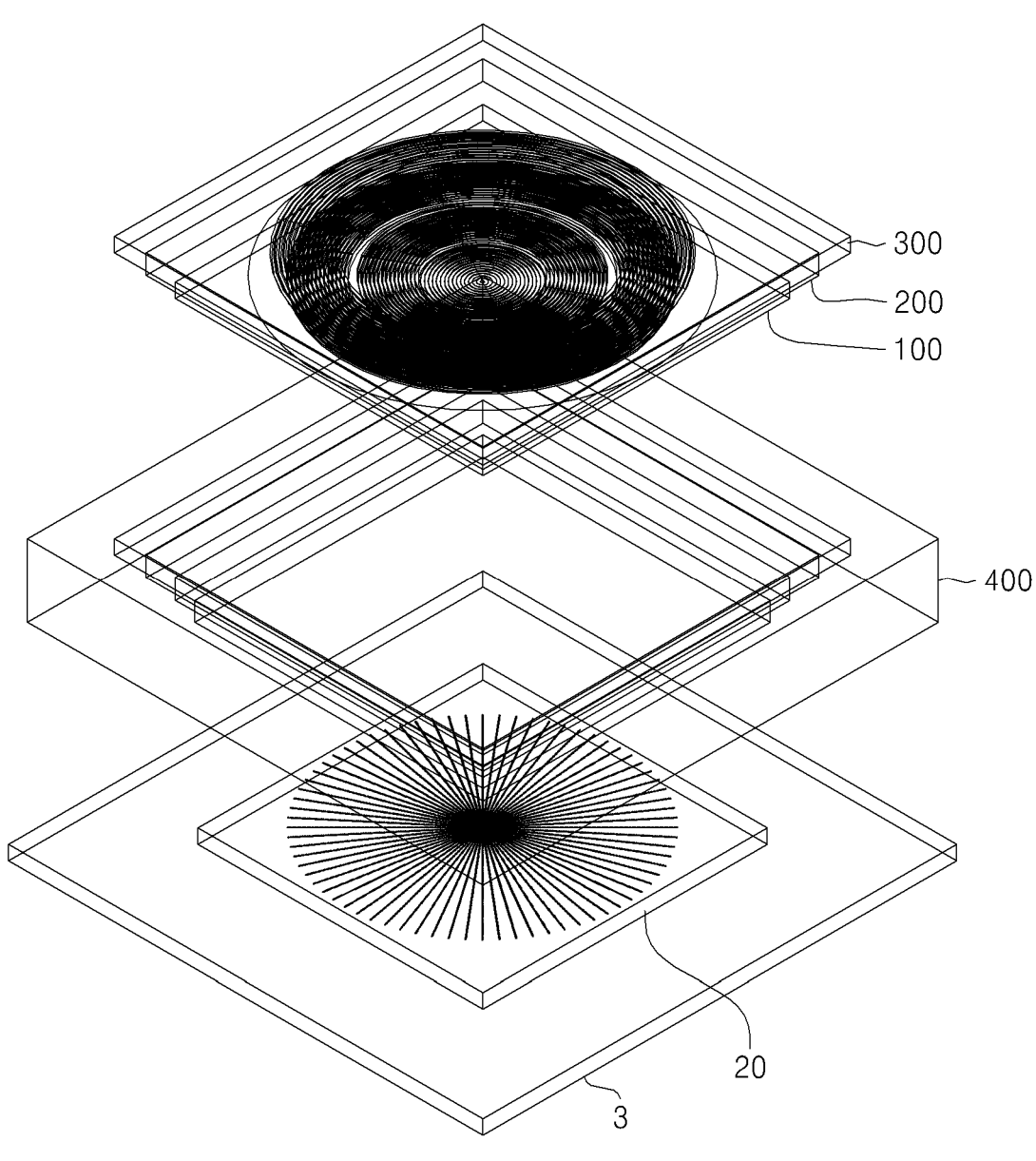
FIG. 16 shows an exploded view of the micro-optics system for non-rotational scanning shown in FIG. 14.
Figure 17:
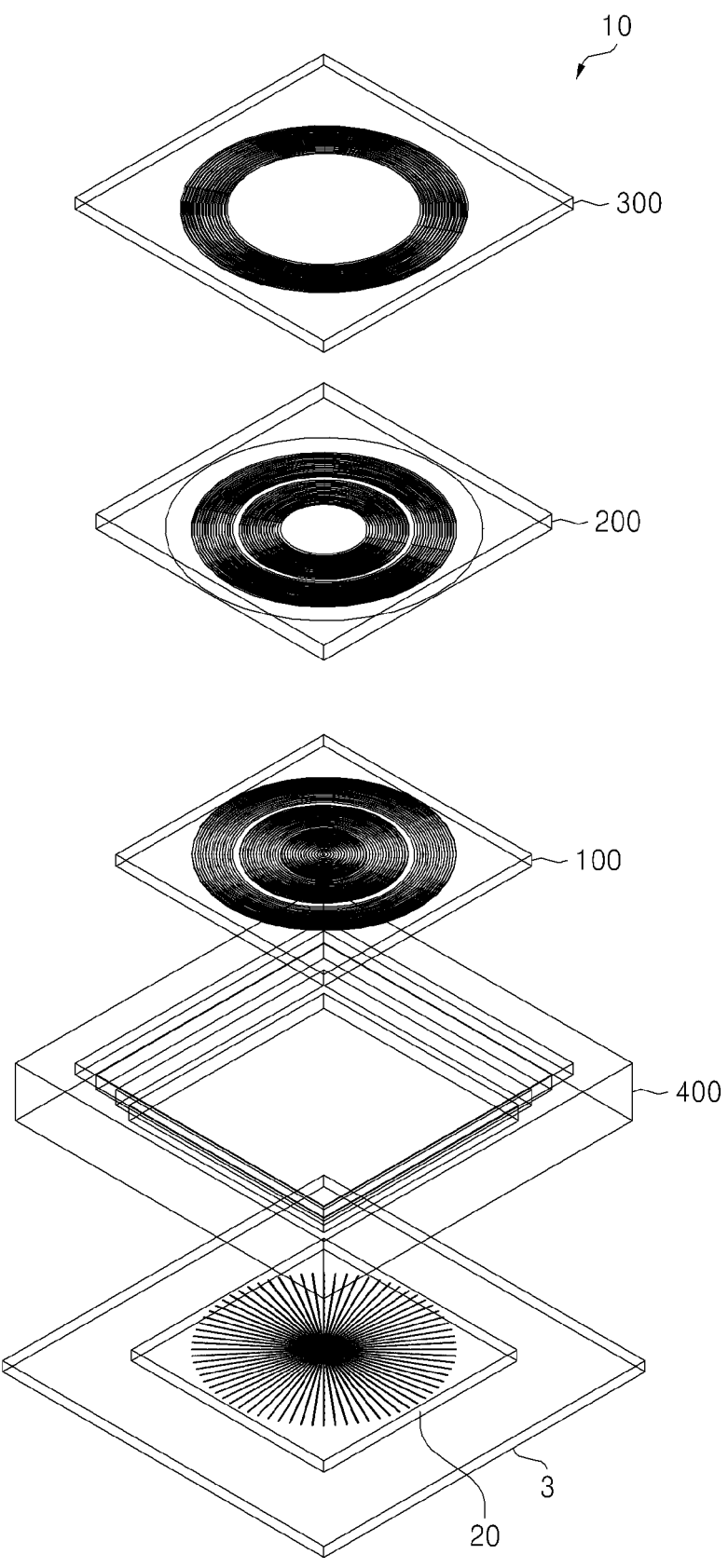
FIG. 17 shows an exploded view of elements of the micro-optics system for non-rotational scanning shown in FIG. 14.

FIG. 14 shows a perspective view of a micro-optics system for non-rotational scanning according to an embodiment of the present invention. FIG. 15 shows a cross-sectional view of the micro-optics system for non-rotational scanning shown in FIG. 14. FIG. 16 shows an exploded view of the micro-optics system for non-rotational scanning shown in FIG. 14. FIG. 17 shows an exploded view of elements of the micro-optics system for non-rotational scanning shown in FIG. 14.

Referring to FIGS. 14 to 17, a micro-optics system 10 for non-rotational scanning includes a plurality of micro-optical elements 100, 200, and 300. The first micro-optical element 100, the second micro-optical element 200, and the third micro-optical element 300 have different inclination patterns, and the different inclination patterns are implemented such that a plurality of light rays incident from a light source 20 are increasingly refracted by 1 degree in an outward direction from the center of the first micro-optical element 100, the second micro-optical element 200, and the third micro-optical element 300. By including the plurality of micro-optical elements 100, 200, and 300 having different inclination patterns, it is possible to scan and detect an object in a certain range without rotating the micro-optics system 10.

The plurality of micro-optical elements 100, 200, and 300 are the same as the plurality of micro-optical elements 100, 200, and 300 shown in FIGS. 1 to 13, and thus a detailed description will be omitted.

In order to fabricate the micro-optics system 10, first, an optical post 400 is mounted on a substrate 3 on which a light source chip 20 is implemented. The light source chip 20 may be implemented as a VCSEL array. A first adhesive 101 is provided along the edge of the light source chip 20. After the optical post 400 is mounted, a first micro-optical element 100 is stacked on the light source chip 20. The first micro-optical element 100 is coupled to the light source chip 20 by the first adhesive 101.

The optical post 400 has a stepped structure that becomes narrower in a downward direction.

A second adhesive 401 is provided along the edge of the optical post 400 at a height H1 corresponding to the height of the first micro-optical element 100 stacked on the light source chip 20. The second micro-optical element 200 may be stacked on the first micro-optical element 100. The second micro-optical element 200 is coupled to the optical post 400 by the second adhesive 401.

A third adhesive 403 is provided along the edge of the optical post 400 corresponding to the height H2 of the second micro-optical element 200 stacked on the light source chip 20. The third micro-optical element 300 may be stacked on the second micro-optical element 200. The third micro-optical element 300 is coupled to the optical post 400 by the third adhesive 403.

The first micro-optical element 100, the second micro-optical element 200, and the third micro-optical element 300 shown in FIGS. 14 to 17 are rectangular. The length of the first micro-optical element 100 is shorter than the length of the second micro-optical element 200. The length of the second micro-optical element 200 is shorter than the length of the third micro-optical element 300.

Figure 18:
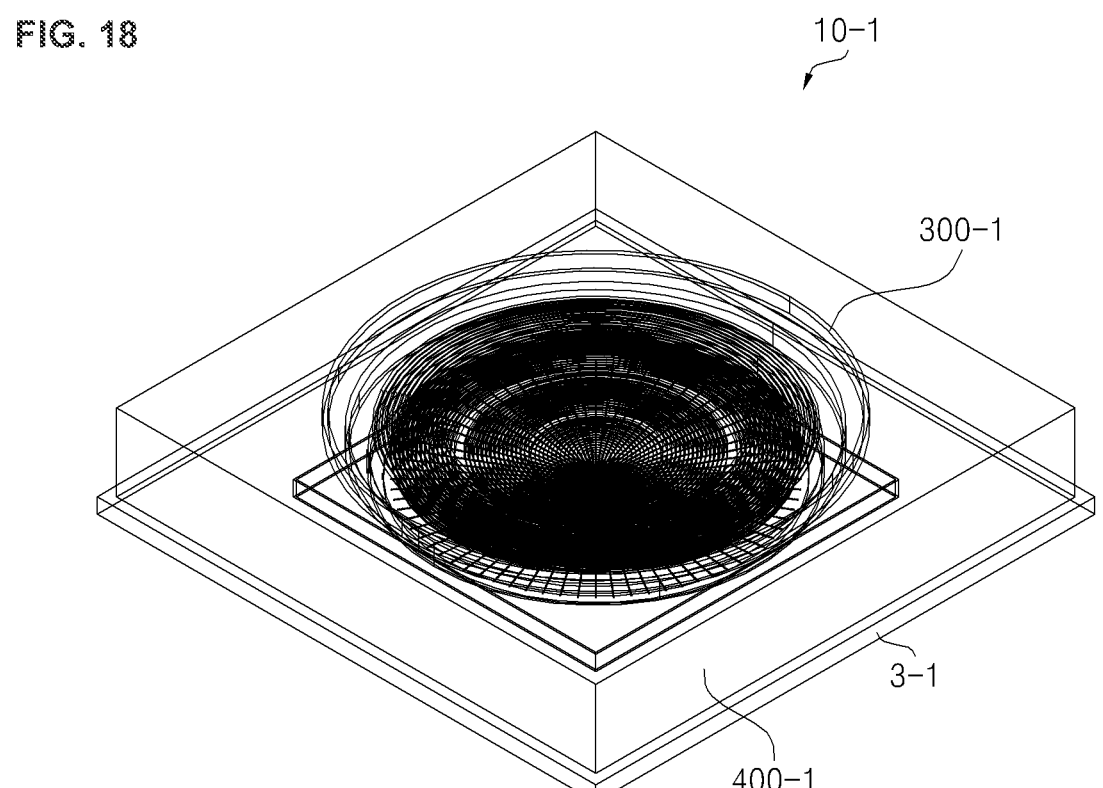
FIG. 18 shows a perspective view of a micro-optics system for non-rotational scanning according to another embodiment of the present invention.
Figure 19:
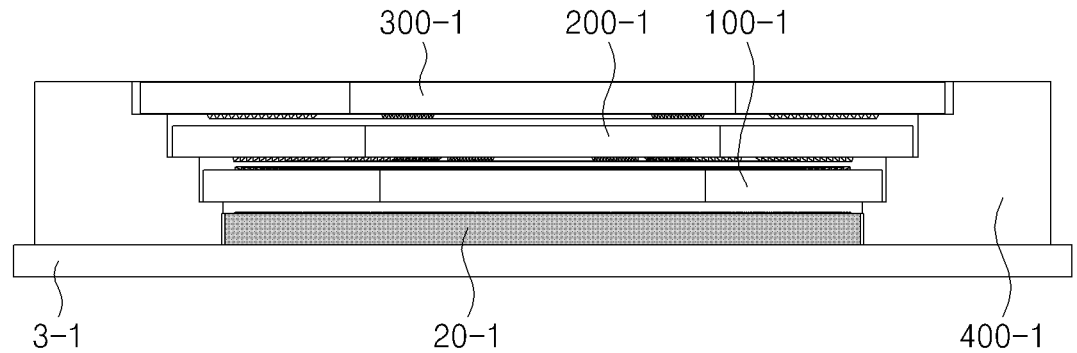
FIG. 19 shows a cross-sectional view of the micro-optics system for non-rotational scanning shown in FIG. 18.
Figure 20:
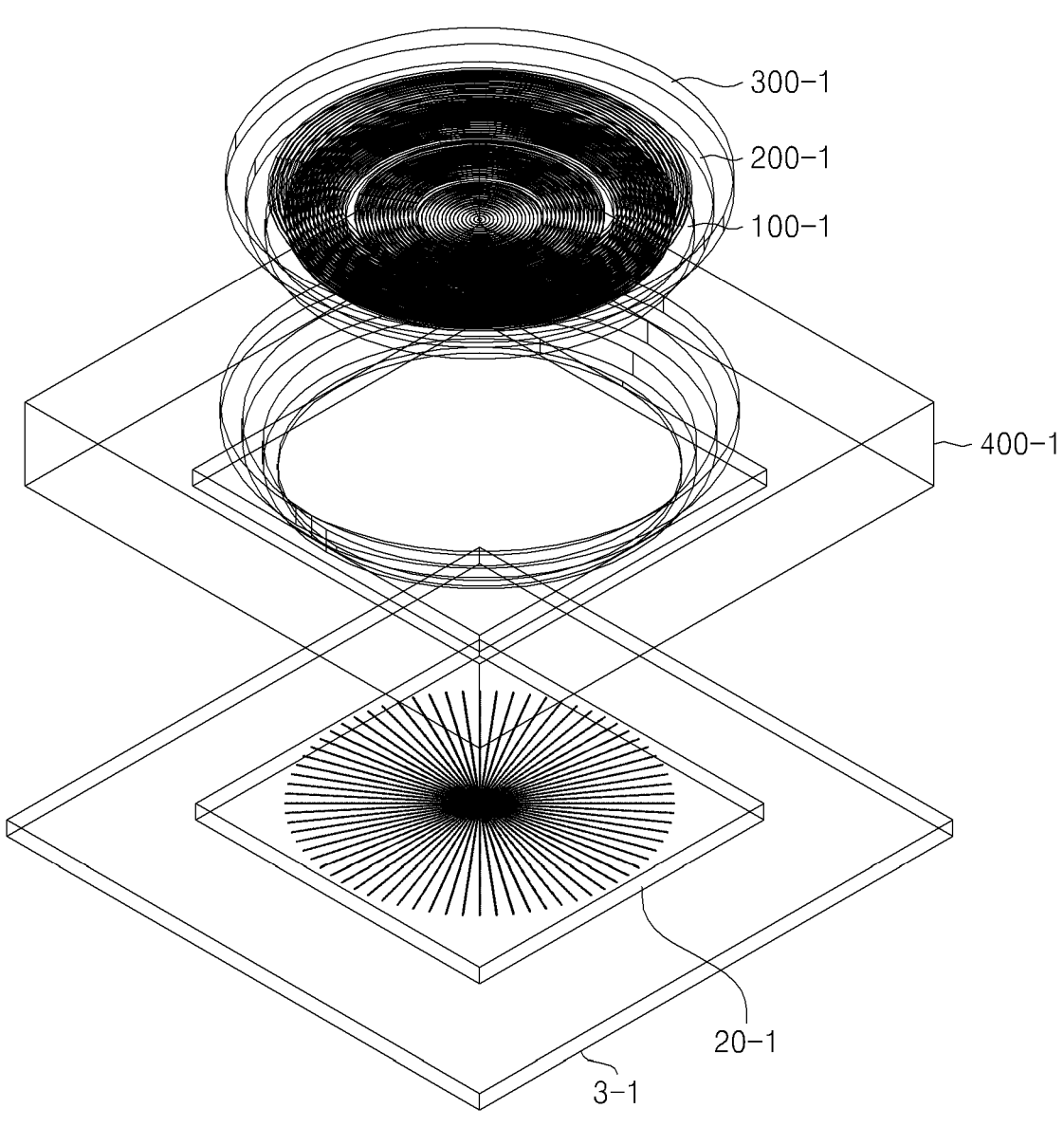
FIG. 20 shows an exploded view of the micro-optics system for non-rotational scanning shown in FIG. 18.
Figure 21:
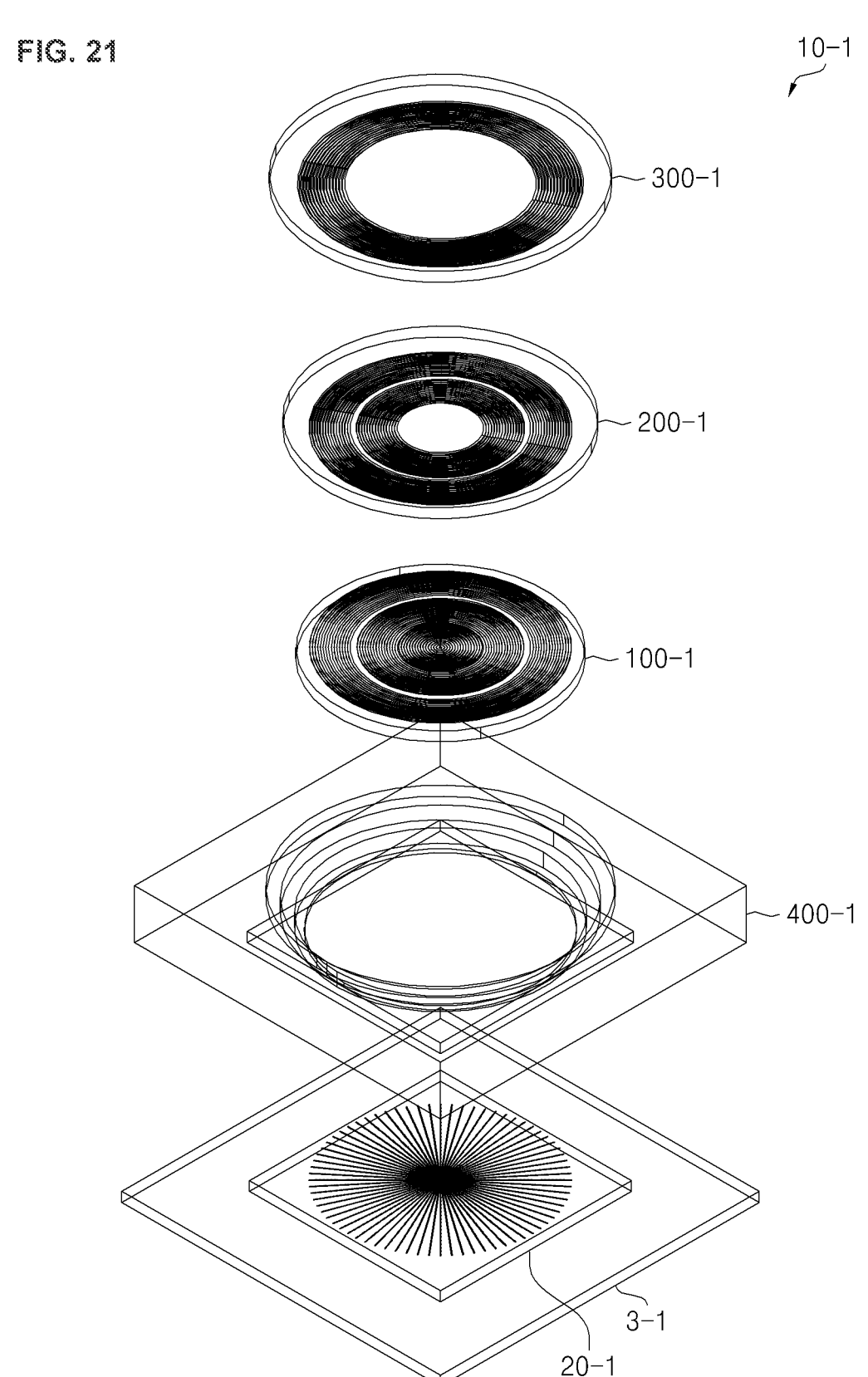
FIG. 21 shows an exploded view of elements of the micro-optics system for non-rotational scanning shown in FIG. 18.

FIG. 18 shows a perspective view of a micro-optics system for non-rotational scanning according to another embodiment of the present invention. FIG. 19 shows a cross-sectional view of the micro-optics system for non-rotational scanning shown in FIG. 18. FIG. 20 shows an exploded view of the micro-optics system for non-rotational scanning shown in FIG. 18. FIG. 21 shows an exploded view of elements of the micro-optics system for non-rotational scanning shown in FIG. 18.

Referring to FIGS. 18 to 21, a micro-optics system 10-1 for non-rotational scanning includes a plurality of micro-optical elements 100-1, 200-1, and 300-1.

The elements 100-1, 200-1, 300-1, 3-1, and 20-1 are similar to the elements shown in FIGS. 14 to 16, and thus a detailed description thereof will be omitted. The plurality of micro-optical elements 100-1, 200-1, and 300-1 are different from those shown in FIGS. 14 to 16 in that the elements are not rectangular but circular. Since the plurality of micro-optical elements 100-1, 200-1, and 300-1 are circular, the inside of an optical post 400-1 is also circular.

Figure 22:
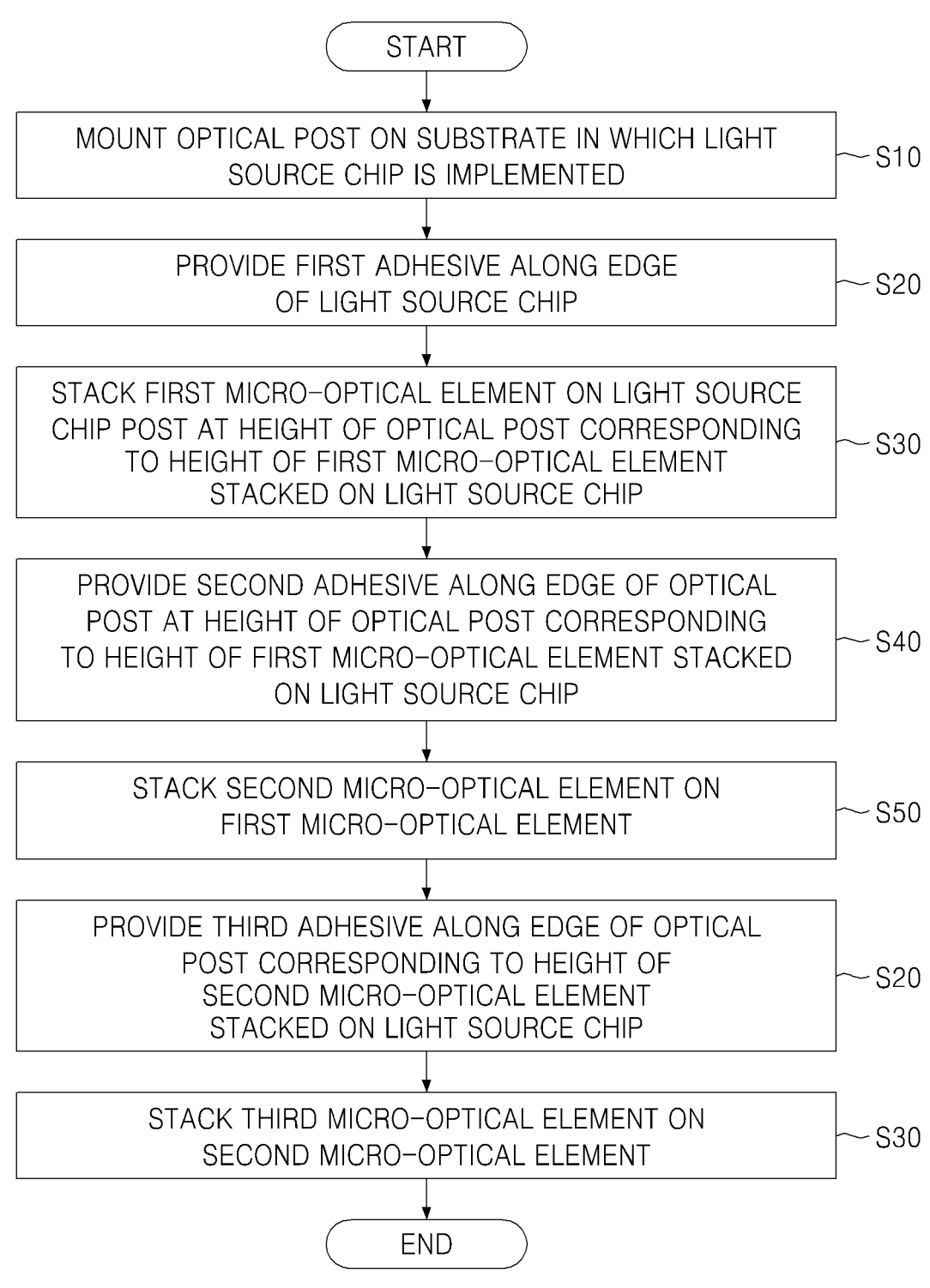
FIG. 22 shows a flowchart illustrating a method of fabricating a micro-optics system for non-rotational scanning according to an embodiment of the present invention.

FIG. 22 shows a flowchart illustrating a method of fabricating a micro-optics system for non-rotational scanning according to an embodiment of the present invention.

Referring to FIGS. 14 to 17 and 22, in order to fabricate the micro-optics system 10, first, an optical post 400 is mounted on a substrate 3 in which a light source chip 20 is implemented (S10).

A first adhesive 101 is provided along the edge of the light source chip 20 (S20).

After the optical post 400 is mounted, a first micro-optical element 100 is stacked on the light source chip 20 (S30). The first micro-optical element 100 is coupled to the light source chip 20 by the first adhesive 101.

The optical post 400 has a stepped structure that becomes narrower in a downward direction.

A second adhesive 401 is provided along the edge of the optical post 400 at a height H1 corresponding to the height of the first micro-optical element 100 stacked on the light source chip 20 (S40).

A second micro-optical element 200 may be stacked on the first micro-optical element 100 (S50). The second micro-optical element 200 is coupled to the optical post 400 by the second adhesive 401.

A third adhesive 403 is provided along the edge of the optical post 400 corresponding to the height H2 of the second micro-optical element 200 stacked on the light source chip 20 (S60).

A third micro-optical element 300 may be stacked on the second micro-optical element 200 (S70). The third micro-optical element 300 is coupled to the optical post 400 by the third adhesive 403.

Figure 23:
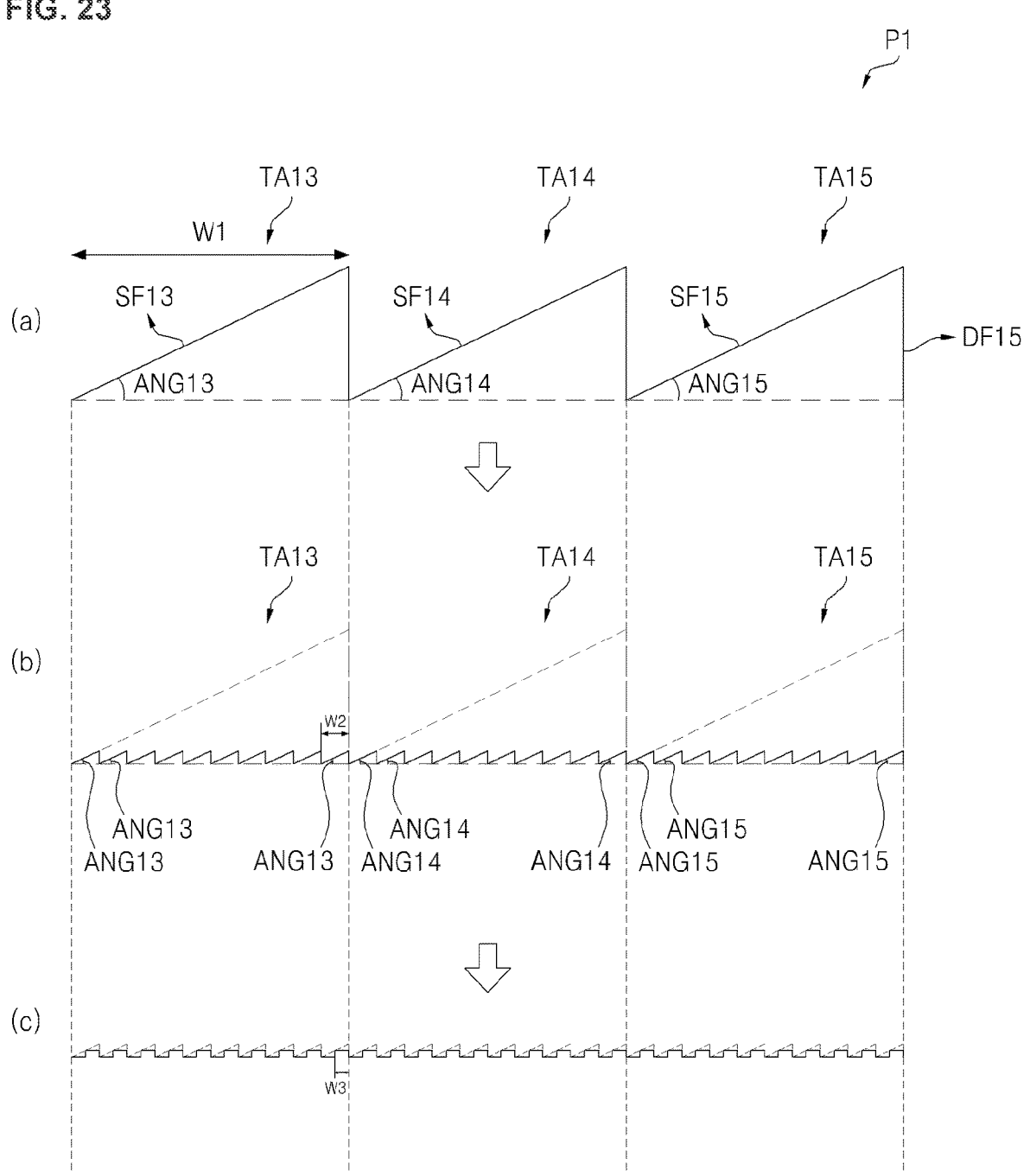
FIG. 23 shows an enlarged view of a part of a first micro-optical element according to another embodiment of the present invention.

FIG. 23 shows an enlarged view of a part of a first micro-optical element according to another embodiment of the present invention. FIG. 23A shows an enlarged view of a part of the first micro-optical element shown in FIG. 5.

Referring to FIGS. 5 and 23A, the fifteenth angle of inclination ANG15 is greater than the fourteenth angle of inclination ANG14. The fourteenth angle of inclination ANG14 is greater than the thirteenth angle of inclination ANG13. In the first inclination pattern P1 of the first micro-optical element 100, the width W1 of the optical element may be 10,000 nm.

FIG. 23B shows an enlarged view of a part of a first micro-optical element obtained by dividing a large triangle of the first inclination pattern shown in FIG. 23A into ten.

Referring to FIGS. 5, 23A, and 23B, large triangles TA13, TA14, and TA15 shown in FIG. 23A are each divided into ten small triangles.

The thirteenth angle of inclination ANG13 of the large triangle TA13 is equal to the angle of inclinations ANG13 of the ten small triangles into which the large triangle TA13 is divided. The fourteenth angle of inclination ANG14 of the large triangle TA14 is equal to the angle of inclinations ANG14 of the ten small triangles into which the large triangle TA14 is divided. Likewise, the fifteenth angle of inclination ANG15 of the large triangle TA15 is equal to the angle of inclinations ANG15 of the ten small triangles into which the large triangle TA15 is divided. The width W2 of the small triangles may be 1,000 nm.

The first inclination pattern P1 may include 15 large triangles, each of which is divided into ten small triangles. In FIGS. 23A and 23B, only three large triangles TA13, TA14, and TA15 and only thirty small triangles are shown.

In some embodiments, the first inclination pattern P1 may be implemented as in FIG. 23B.

FIG. 23C shows an enlarged view of a part of a first micro-optical element for 2-level diffraction.

Referring to FIGS. 5, 23A, 23B, and 23C, ten small triangles may be implemented as a diffraction pattern using 2-level binary data. That is, the ten small triangles are classified into two states, i.e., 0 and 1. The width W3 of the triangles in each state may be 500 nm.

In some embodiments, the first inclination pattern P1 may be implemented as in FIG. 23C.

Figure 24:
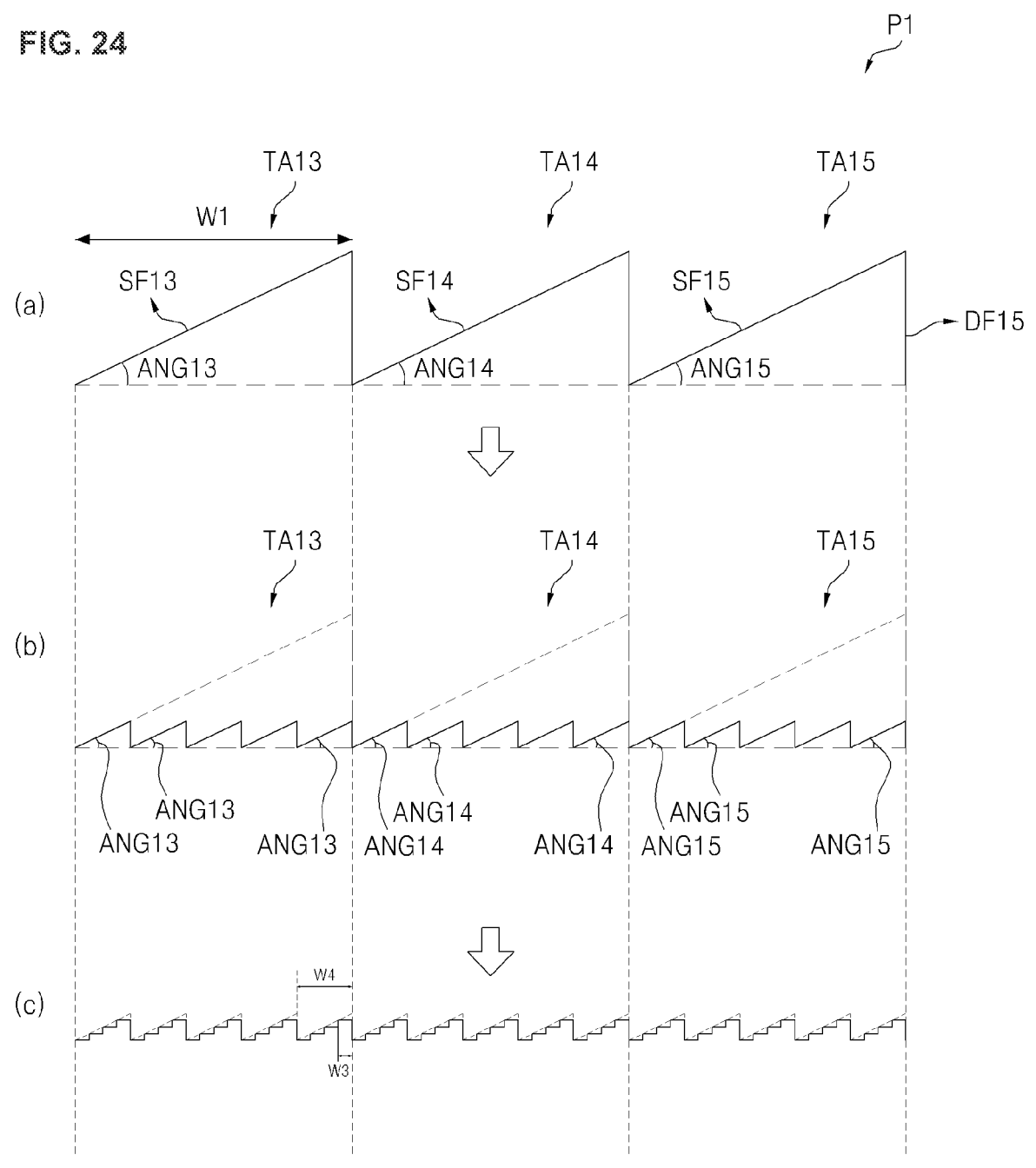

FIG. 24 shows an enlarged view of a part of a first micro-optical element according to still another embodiment of the present invention. FIG. 24A shows an enlarged view of a part of the first micro-optical element shown in FIG. 5. FIG. 24A is identical to FIG. 23A.

FIG. 24B shows an enlarged view of a part of a first micro-optical element obtained by dividing a large triangle of the first inclination pattern shown in FIG. 23A into five.

Referring to FIGS. 5, 24A, and 24B, large triangles TA13, TA14, and TA15 shown in FIG. 24A are each divided into five small triangles.

The thirteenth angle of inclination ANG13 of the large triangle TA13 is equal to the angle of inclinations ANG13 of the five small triangles into which the large triangle TA13 is divided. The fourteenth angle of inclination ANG14 of the large triangle TA14 is equal to the angle of inclinations ANG14 of the five small triangles into which the large triangle TA14 is divided. Likewise, the fifteenth angle of inclination ANG15 of the large triangle TA15 is equal to the angle of inclinations ANG15 of the five small triangles into which the large triangle TA15 is divided. The width W4 of the small triangles may be 2,000 nm.

The first inclination pattern P1 may include 15 large triangles, each of which is divided into five small triangles. In FIGS. 24A and 24B, only three large triangles TA13, TA14, and TA15 and only fifteen small triangles are shown.

In some embodiments, the first inclination pattern P1 may be implemented as in FIG. 24B.

FIG. 24C shows an enlarged view of a part of a first micro-optical element for 4-level diffraction.

Referring to FIGS. 5, 24A, 24B, and 24C, five small triangles may be implemented as a 4-level diffraction pattern. That is, the ten small triangles may be implemented with a series of steps classified into four states, i.e., 0, 1, 2, and 3. The width W5 of the triangles in each state may be 500 nm.

Each of the five triangles shown in FIG. 24C may be implemented in a form having a series of steps inside each of the five triangles, unlike the ten triangles shown in FIG. 23C.

In some embodiments, the first inclination pattern P1 may be implemented as in FIG. 24C. That is, the first inclination pattern P1 may include a series of steps expressed in four states.

Figure 25:
FIG. 25 shows an enlarged view of a part of a second micro-optical element according to another embodiment of the present invention.

FIG. 25 shows an enlarged view of a part of a second micro-optical element according to another embodiment of the present invention. FIG. 25A shows an enlarged view of a part of the second micro-optical element shown in FIG. 7.

Referring to FIGS. 7 and 25A, the thirtieth angle of inclination ANG30 is greater than the twenty-ninth angle of inclination ANG29. The twenty-ninth angle of inclination ANG29 is greater than the twenty-eighth angle of inclination ANG28.

FIG. 25B shows an enlarged view of a part of a second micro-optical element obtained by dividing a large triangle included in the second inclination pattern shown in FIG. 25A into ten.

Referring to FIGS. 7, 25A, and 25B, large triangles TA28, TA29, and TA30 shown in FIG. 25A are each divided into ten small triangles.

The twenty-eighth angle of inclination ANG28 of the large triangle TA28 is equal to the angle of inclinations ANG28 of the ten small triangles into which the large triangle TA28 is divided. The twenty-ninth angle of inclination ANG29 of the large triangle TA29 is equal to the angle of inclinations ANG29 of the ten small triangles into which the large triangle TA29 is divided. Likewise, the thirtieth angle of inclination ANG30 of the large triangle TA30 is equal to the angle of inclinations ANG30 of the ten small triangles into which the large triangle TA30 is divided.

The second inclination pattern P2 may include 15 large triangles, each of which is divided into ten small triangles. In FIGS. 25A and 25B, only three large triangles TA28, TA29, and TA30 and only thirty small triangles are shown.

In some embodiments, the second inclination pattern P2 may be implemented as in FIG. 25B.

FIG. 25C shows an enlarged view of a part of a second micro-optical element for 2-level diffraction.

Referring to FIGS. 7, 25A, 25B, and 25C, ten small triangles may be implemented as a diffraction pattern using 2-level binary data. That is, the ten small triangles are classified into two states, i.e., 0 and 1.

In some embodiments, the second inclination pattern P2 may be implemented as in FIG. 25C.

Figure 26:
FIG. 26 shows an enlarged view of a part of a second micro-optical element according to still another embodiment of the present invention.

FIG. 26 shows an enlarged view of a part of a second micro-optical element according to still another embodiment of the present invention. FIG. 26A shows an enlarged view of a part of the second micro-optical element shown in FIG. 7. FIG. 26A is identical to FIG. 25A.

FIG. 26B shows an enlarged view of a part of a second micro-optical element obtained by dividing a large triangle included in the second inclination pattern shown in FIG. 25A into five.

Referring to FIGS. 5, 26A, and 26B, large triangles TA28, TA29, and TA30 shown in FIG. 26A are each divided into five small triangles.

The twenty-eighth angle of inclination ANG28 of the large triangle TA28 is equal to the angle of inclinations ANG28 of the five small triangles into which the large triangle TA28 is divided. The twenty-ninth angle of inclination ANG29 of the large triangle TA29 is equal to the angle of inclinations ANG29 of the five small triangles into which the large triangle TA29 is divided. Likewise, the thirtieth angle of inclination ANG30 of the large triangle TA30 is equal to the angle of inclinations ANG30 of the five small triangles into which the large triangle TA30 is divided.

The second inclination pattern P2 may include 15 large triangles, each of which is divided into five small triangles. In FIGS. 26A and 26B, only three large triangles TA28, TA29, and TA30 and only fifteen small triangles are shown.

In some embodiments, the second inclination pattern P2 may be implemented as in FIG. 26B.

FIG. 26C shows an enlarged view of a part of a second micro-optical element for 4-level diffraction.

Referring to FIGS. 7, 26A, 26B, and 26C, five small triangles may be implemented as a 4-level diffraction pattern. That is, the ten small triangles may be implemented with a series of steps classified into four states, i.e., 0, 1, 2, and 3.

Each of the five triangles shown in FIG. 26C may be implemented in a form having a series of steps inside each of the five triangles, unlike the ten triangles shown in FIG. 25C.

In some embodiments, the second inclination pattern P2 may be implemented as in FIG. 26C. That is, the second inclination pattern P2 may include a series of steps expressed in four states.

Figure 27:
FIG. 27 shows an enlarged view of a part of a third micro-optical element according to another embodiment of the present invention.

FIG. 27 shows an enlarged view of a part of a third micro-optical element according to another embodiment of the present invention. FIG. 27A shows an enlarged view of a part of the third micro-optical element shown in FIG. 9. FIG. 27B shows an enlarged view of a part of a third micro-optical element obtained by dividing a large triangle included in the third inclination pattern shown in FIG. 27A into ten. FIG. 27C shows an enlarged view of a part of a third micro-optical element for 2-level binary diffraction.

The forty-fifth angle of inclination ANG45 is greater than the forty-fourth angle of inclination ANG44. The forty-fourth angle of inclination ANG44 is greater than the forty-third angle of inclination ANG43.

Large triangles TA43, TA44, and TA45 shown in FIG. 27A are each divided into ten small triangles. The angle of inclinations ANG43, ANG44, and ANG45 of the ten small triangles into which the large triangle TA28 is divided are all equal.

The third inclination pattern P3 may include 15 large triangles, each of which is divided into ten small triangles.

In some embodiments, the third inclination pattern P3 may be implemented as in FIG. 27B.

Also, in some embodiments, the ten small triangles may be implemented as a diffraction pattern using 2-level binary data. That is, the ten small triangles are classified into two states, i.e., 0 and 1.

In some embodiments, the third inclination pattern P3 may be implemented as in FIG. 27C.

Figure 28:
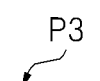
FIG. 28 shows an enlarged view of a part of a third micro-optical element according to still another embodiment of the present invention.

FIG. 28 shows an enlarged view of a part of a third micro-optical element according to still another embodiment of the present invention. FIG. 28A shows an enlarged view of a part of the third micro-optical element shown in FIG. 9. FIG. 28A is identical to FIG. 27A.

FIG. 28B shows an enlarged view of a part of a third micro-optical element obtained by dividing a large triangle included in the third inclination pattern shown in FIG. 28A into five.

The third inclination pattern P3 may include 15 large triangles TA43, TA44, and TA45, each of which is divided into five small triangles. In FIGS. 28A and 28B, only three large triangles and only fifteen small triangles are shown.

In some embodiments, the third inclination pattern P3 may be implemented as in FIG. 28B.

FIG. 28C shows an enlarged view of a part of a third micro-optical element for 4-level diffraction.

Referring to FIG. 28C, the five small triangles may be implemented as a 4-level diffraction pattern. That is, the ten small triangles may be implemented with a series of steps classified into four states, i.e., 0, 1, 2, and 3.

Each of the five triangles shown in FIG. 28C may be implemented in a form having a series of steps inside each of the five triangles, unlike the ten triangles shown in FIG. 27C.

In some embodiments, the third inclination pattern P3 may be implemented as in FIG. 28C. That is, the third inclination pattern P3 may include a series of steps expressed in four states.

The micro-optics system for non-rotational scanning according to an embodiment of the present invention can scan and detect an object in a certain range without rotating the micro-optics system by providing a plurality of micro-optics systems having different diffraction inclination patterns.

While the present invention has been described with reference to an embodiment shown in the accompanying drawings, it should be understood by those skilled in the art that this embodiment is merely illustrative of the invention and that various modifications and equivalents may be made without departing from the spirit and scope of the invention. Accordingly, the technical scope of the present invention should be determined only by the technical spirit of the appended claims.

What is claimed is:

1. A micro-optics system for non-rotational scanning, the micro-optics system comprising a plurality of micro-optical elements having different inclination patterns, wherein the different inclination patterns are implemented such that a plurality of light rays incident from a light source are increasingly refracted by 1 degree in an outward direction from a center of the plurality of micro-optical elements, wherein the plurality of micro-optical elements comprise a first micro-optical element, a second micro-optical element, and a third micro-optical element, the first micro-optical element comprises:
a first surface which is flat; and
a second surface which includes a first region, a second region, and a third region arranged with respect to the center, and
each of the first region, the second region, and the third region includes a first inclination pattern implemented such that the plurality of light rays are increasingly refracted in a range of 1 to 15 degrees from the center.

2. The micro-optics system of claim 1, wherein the second micro-optical element is stacked on the first micro-optical element, the third micro-optical element is stacked on the second micro-optical element, a length of the first micro-optical element is shorter than a length of the second micro-optical element, and the length of the second micro-optical element is shorter than a length of the third micro-optical element.

3. The micro-optics system of claim 1, wherein the first region, the second region, and the third region include a gap between the first region and the second region and a gap between the second region and the third region, and the gap between the second region and the third region is greater than the gap between the first region and the second region.

4. The micro-optics system of claim 1, wherein the second micro-optical element comprises:

a third surface including a fourth region, a fifth region, and a sixth region that face the first region, the second region, and the third region, respectively; and a fourth surface including a seventh region, an eighth region, and a ninth region that correspond to the fourth region, the fifth region, and the sixth region, respectively, the fourth region is flat, and each of the fifth region and the sixth region includes a second inclination pattern implemented such that the plurality of light rays refracted through the second region and the third region are refracted in a range of 16 to 30 degrees from the center.

5. The micro-optics system of claim 1, wherein the third micro-optical element comprises:

a fifth surface including a tenth region, an eleventh region, and a twelfth region that face the seventh region, the eighth region, and the ninth region, respectively; and a sixth surface including a thirteenth region, a fourteenth region, and fifteenth region that correspond to the tenth region, the eleventh region, and the twelfth region, respectively, the seventh region is flat, and the twelfth region includes a third inclination pattern implemented such that the plurality of light rays refracted through the sixth region are refracted in a range of 31 to 45 degrees from the center.

6. The micro-optics system of claim 1, wherein the center of the plurality of micro-optical elements includes no inclination pattern to prevent light rays incident from the center among the plurality of light rays from being refracted.

7. A micro-optics system for non-rotational scanning, the micro-optics system comprising a plurality of micro-optical elements having different inclination patterns, wherein the plurality of micro-optical elements are classified into three zones, a first zone among the three zones includes a first micro-optical element that is included in the plurality of micro-optical elements and that includes a first inclination pattern such that a plurality of light rays incident from a light source are refracted in a range of 1 to 15 degrees from a center, a second zone among the three zones includes a second micro-optical element that is included in the plurality of micro-optical elements and that includes a second inclination pattern such that the plurality of incident light rays are refracted in a range of 16 to 30 degrees from the center, and a third zone among the three zones includes a third micro-optical element that is included in the plurality of micro-optical elements and that includes a third inclination pattern such that the plurality of incident light rays are refracted in a range of 31 to 45 degrees from the center.

8. The micro-optics system of claim 7, wherein the first inclination pattern is implemented to face the second inclination pattern, and the third inclination pattern does not face the second inclination pattern but is implemented to correspond to the second inclination pattern.

9. The micro-optics system of claim 7, wherein the first inclination pattern includes a plurality of first inclined planes and a plurality of second inclined planes, and the angle of inclination of the plurality of first inclined planes increases in a direction away from the center.

10. The micro-optics system of claim 7, wherein the second inclination pattern includes a plurality of third inclined planes and a plurality of fourth inclined planes, and the angle of inclination of the plurality of third inclined planes increases in a direction away from the center.

11. The micro-optics system of claim 7, wherein the third inclination pattern includes a plurality of fifth inclined planes and a plurality of sixth inclined planes, and the angle of inclination of the plurality of fifth inclined planes increases in a direction away from the center.

12. The micro-optics system of claim 7, wherein light rays incident from the center are not refracted.

13. A micro-optics system for non-rotational scanning, the micro-optics system comprising:

a first micro-optical element including a first surface and a second surface;

a second micro-optical element including a third surface and a fourth surface; and a third micro-optical element including a fifth surface and a sixth surface, wherein the first surface is flat, the second surface includes a first region, a second region, and a third region arranged with respect to a center, each of the first region, the second region, and the third region includes a first inclination pattern implemented such that a plurality of light rays incident from a light source are refracted in a range of 1 to 15 degrees in an outward direction from the center, light incident from the center is not refracted, the third surface includes a fourth region, a fifth region, and a sixth region that face the first region, the second region, and the third region, respectively, the fourth region is flat, each of the fifth region and the sixth region includes a second inclination pattern implemented such that the light refracted through the second region and the third region is refracted in a range of 16 to 30 degrees, the fifth surface includes a seventh region, an eighth region, and a ninth region that correspond to the fourth region, the fifth region, and the sixth region, respectively, the seventh region is flat, the eighth region and the ninth region include an inclination pattern, and the fifth surface includes a third inclination pattern implemented such that the light refracted through the sixth region is refracted in a range of 31 to 45 degrees.

* * * * *